United States Patent
Pal et al.

(10) Patent No.: US 6,761,403 B2
(45) Date of Patent: Jul. 13, 2004

(54) HEADREST APPARATUS FOR VEHICLE

(75) Inventors: Chinmoy Pal, Kanagawa-ken (JP); Izumi Kobayashi, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/216,316

(22) Filed: Aug. 12, 2002

(65) Prior Publication Data

US 2003/0030309 A1 Feb. 13, 2003

(30) Foreign Application Priority Data

Aug. 13, 2001 (JP) ..................................... P2001-245816
Aug. 13, 2001 (JP) ..................................... P2001-245819

(51) Int. Cl.⁷ .......................... B60N 2/42; B60R 21/00; B60R 22/28; A47C 7/36
(52) U.S. Cl. .................. 297/216.12; 297/391; 297/404; 297/220
(58) Field of Search ............................ 297/216.12, 404, 297/391, 220

(56) References Cited

U.S. PATENT DOCUMENTS

| | | | | |
|---|---|---|---|---|
| 4,883,243 A | * | 11/1989 | Herndon ............ | 244/216.12 X |
| 5,752,742 A | * | 5/1998 | Kerner et al. ............... | 297/391 |
| 6,139,106 A | * | 10/2000 | Aldridge ..................... | 297/391 |
| 6,513,871 B2 | * | 2/2003 | Bartels .................. | 297/216.12 |
| 6,623,073 B2 | * | 9/2003 | Schafer et al. ......... | 297/216.12 |
| 2003/0122409 A1 | * | 7/2003 | Pal et al. ............... | 297/216.12 |
| 2003/0151279 A1 | * | 8/2003 | Fowler .................. | 297/216.12 |
| 2003/0227199 A1 | * | 12/2003 | Yoshizawa et al. .... | 297/216.12 |

FOREIGN PATENT DOCUMENTS

| | | |
|---|---|---|
| JP | 6-59163 | 5/1994 |
| JP | 7-291005 | 11/1995 |

* cited by examiner

*Primary Examiner*—Rodney B. White
(74) *Attorney, Agent, or Firm*—McDermott, Will & Emery

(57) ABSTRACT

A headrest apparatus for a vehicle has a headrest body 10a provided with a left headrest member 11 and a right headrest member 12 and a locking unit 40 for holding the left and right headrest members 11, 12 at their initial positions. At a vehicle rear-end collision, the locking unit 40 is released by a control unit 50 for detecting the vehicle rear-end collision. As a result, the left and right headrest members 11, 12 rotate forward about the vehicle, so that a sheet 13 stretched between respective separation ends of the members 11, 12 is unfolded to restrict a passenger's head without making use of the passenger's inertia at the collision, surely and rapidly.

17 Claims, 38 Drawing Sheets

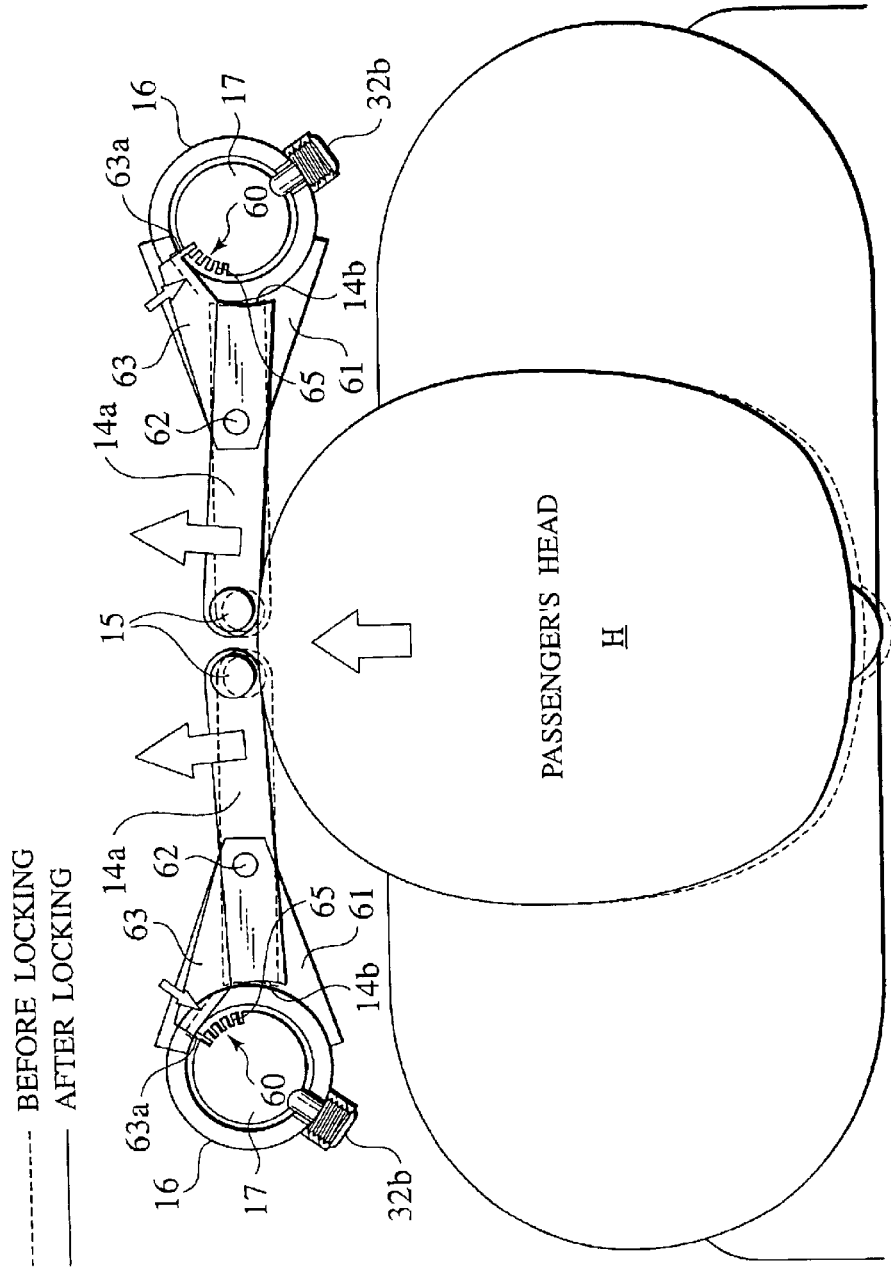

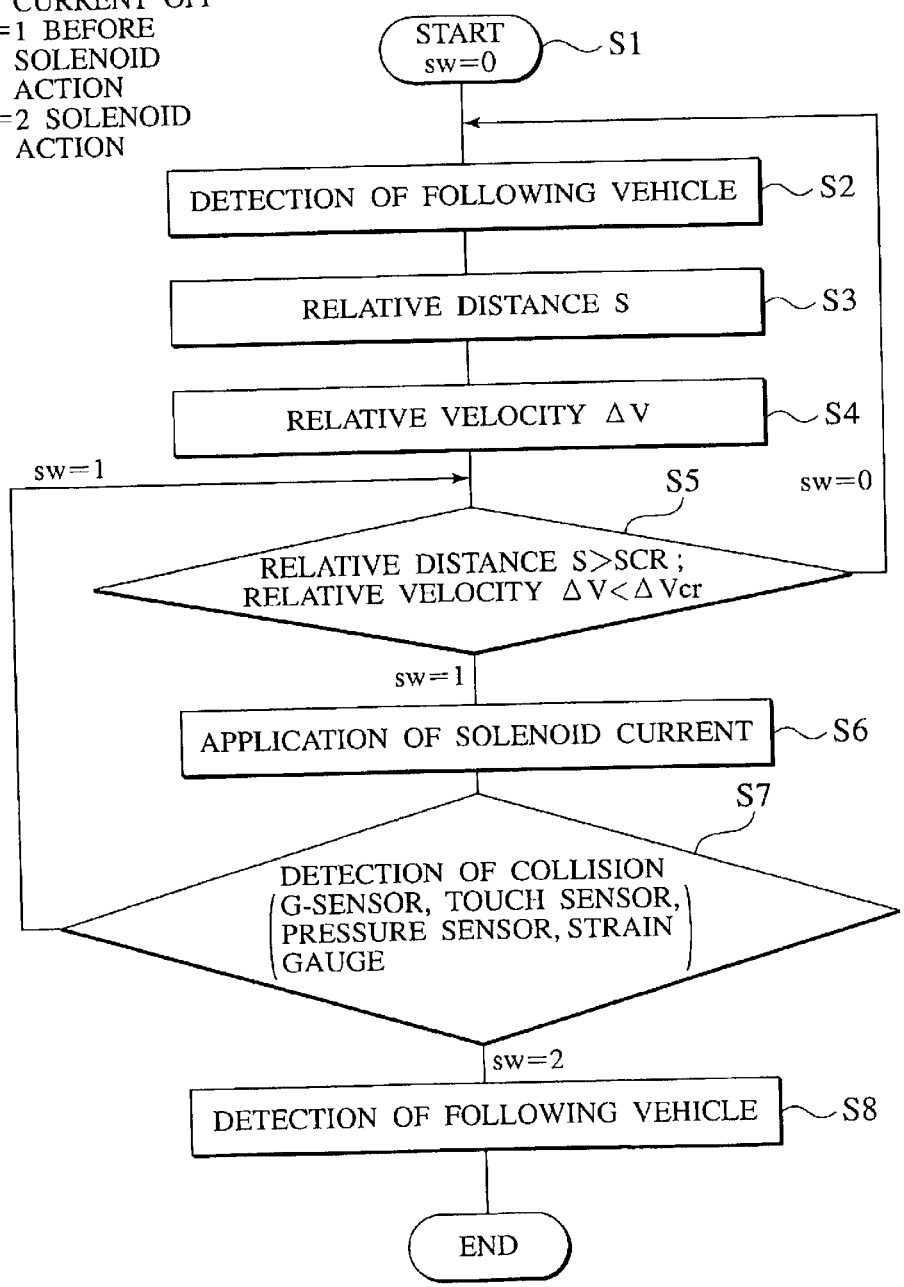

HEADREST APPARATUS FOR VEHICLE

BACKGROUND OF THE INVENTION

1. Field of the Invention

The present invention relates to a headrest apparatus for a vehicle, such as an automobile.

2. Description of Related Art

Japanese Patent Application Laid-open No. 7-291005 discloses an automotive seat-back structure for a passenger's head when the passenger's vehicle has a rear-end collision.

According to this seat-back structure, at the vehicle rear-end collision, a dynamic load of inertia exerted on the passenger is born by a seat-back and then, a component member of the seat-back moves. Then, this movement of the member is transmitted to a headrest support arm, so that a headrest body moves forward. In this way, the above seat-back structure is capable of preventing the passenger's head from being moved back excessively.

Japanese Utility Model Application Laid-open No. 6-59163 discloses an air bag apparatus which can prevent the passenger's head from being moved back even if a space is remained between the passenger's neck and the headrest body at the vehicle rear-end collision. This airbag apparatus includes a sensor that is activated by inertia force of the passenger at the vehicle rear-end collision and an air bag accommodated in the head rest body and also inflated by the so-activated sensor.

In the firstly-mentioned seat-back structure, however, when the backward displacement of the passenger gets larger (more than a predetermined value), it is started to move the head rest body forward. Therefore, under a situation that the displacement of the passenger is relatively small immediately after the collision, there arises a problem of impossibility to move the head rest body sufficiently forward.

In the secondary-mentioned air bag apparatus, since an explosion sound is generated when expanding the air bag, there is a possibility of increasing a burden on a passenger's ear.

SUMMARY OF THE INVENTION

Under the above circumstance, it is an object of the present invention to provide a headrest apparatus for a vehicle, which thrusts the headrest body forward about the vehicle on detection of the vehicle rear-end collision, whereby the passenger's head can be held certainly and rapidly without making use of the passenger's inertia at the vehicle rear-end collision.

According to the present invention, the above-mentioned object is accomplished by a headrest apparatus for a vehicle, comprising a headrest body attached to an upper end of a seat-back through stays to support a passenger's head; wherein the headrest body includes a pair of left and right headrest members separated from each other at a substantial center of the headrest body in the left-and-right direction of the vehicle, the left and right headrest members each having one separation end adjacent to the other headrest member and the other end in opposition to the separation end, rotatably attached to the stay; a sheet stretched between the separation ends of the left and right headrest members; rotating-and-urging mechanisms for rotating and urging the left and right headrest members forward about the vehicle, respectively; a locking unit for holding the left and right headrest members at their initial positions in opposition to urging forces by the rotating-and-urging mechanisms; and a control unit for releasing the locking unit on detection of a rear-end collision of the vehicle.

BRIEF DESCRIPTION OF THE DRAWINGS

FIG. 12 is a plan view showing the operating condition of the fixing mechanism of the first embodiment of the invention;

FIG. 14 is a flow chart to control the locking mechanism of the first embodiment of the invention;

DESCRIPTION OF THE PREFERRED EMBODIMENT

Figure 1:
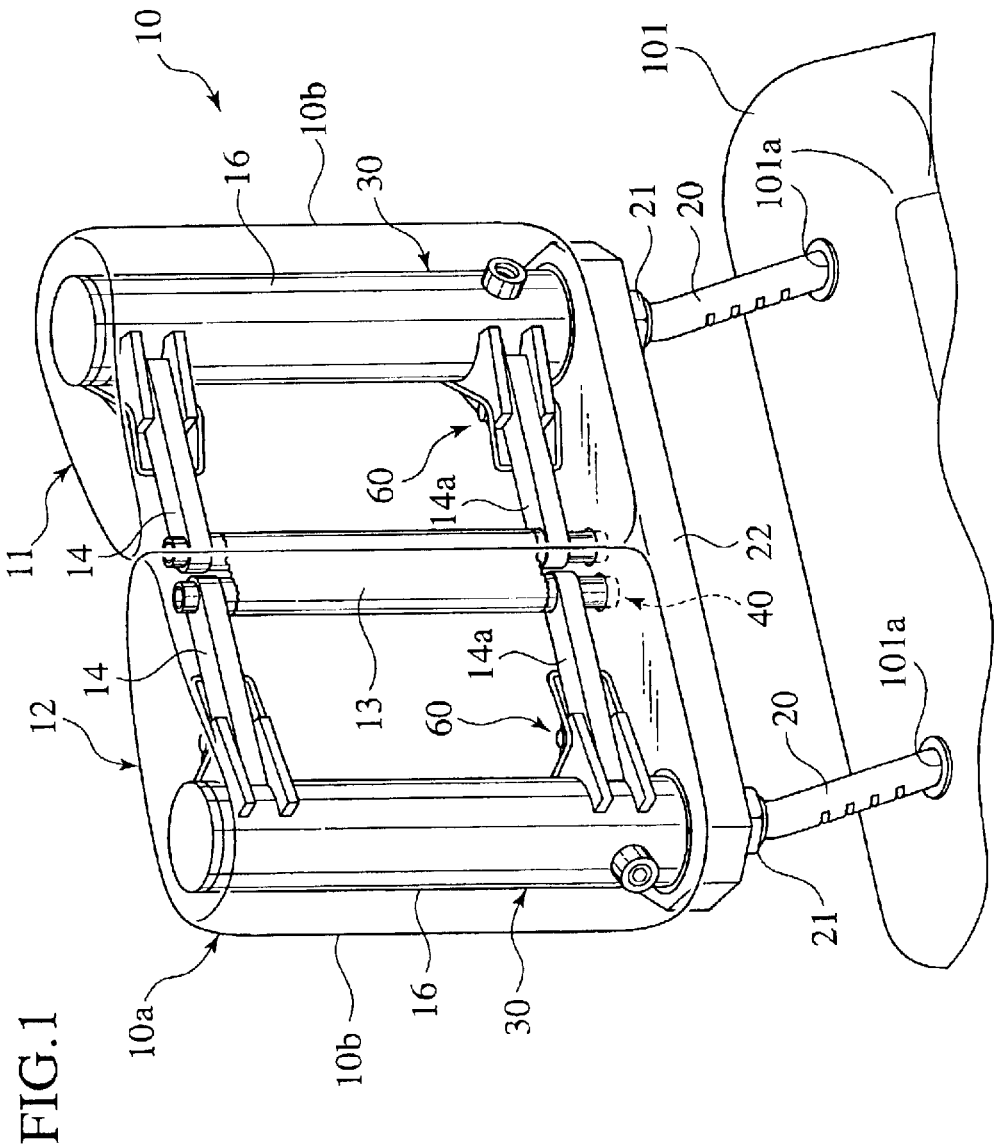
FIG. 1 is a perspective view showing a headrest apparatus in accordance with the first embodiment of the present invention.
Figure 2:
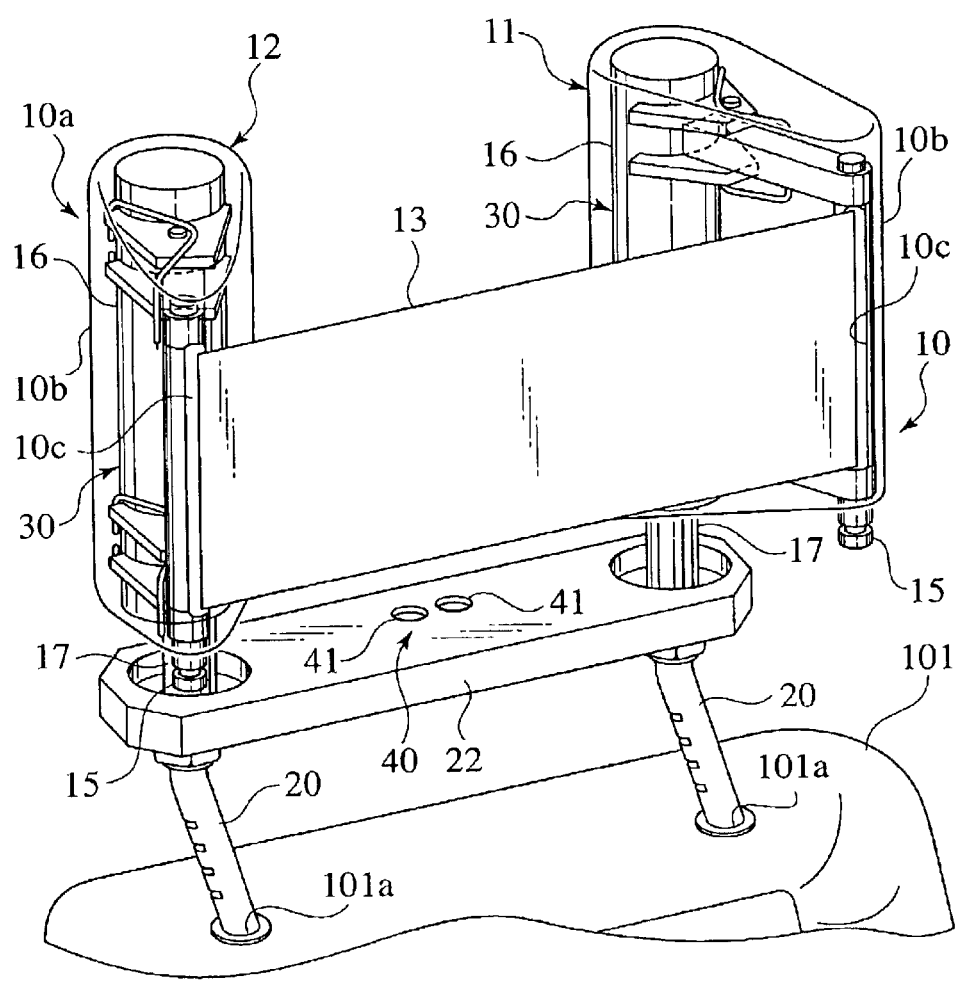
FIG. 2 is a perspective view showing the operative condition of the headrest apparatus of FIG. 1.
Figure 3:
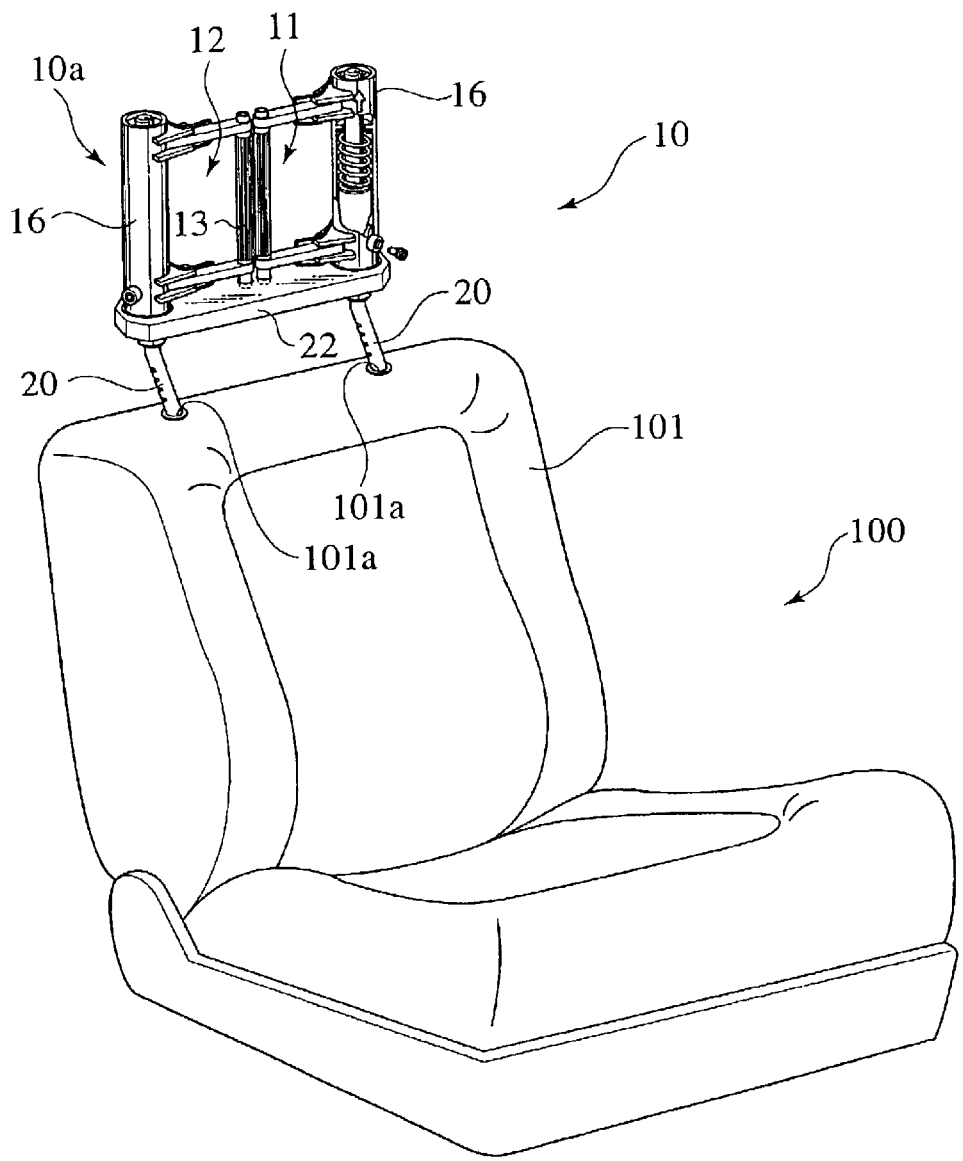
FIG. 3 is a perspective view of a seat equipped with the headrest apparatus of the first embodiment of the invention.

Referring to accompanying drawings, various embodiments of the present invention will be described below. Throughout the embodiments, terms "forward" and "rearward" designate—front direction about vehicle— and—rear direction about vehicle—, respectively. Additionally, a phrase "left-and-right direction" means—direction of vehicle's width—.

[1st. Embodiment]

As shown in FIGS. 1 to 4, a vehicle headrest apparatus 10 of this embodiment is arranged on the upper end of a seat-back 101 of a vehicle seat 100 on which a passenger is to be seated. The apparatus 10 includes a headrest body 10a for supporting a passenger's head thereon. The headrest body 10a is movably attached to the seat-back 101 through a pair of stays 20, allowing the vertical position of the headrest body 10a to be adjusted. That is, these stays 20 are slidably inserted into left and right attachment holes 101a on the top of the seat-back 101, allowing the height of the body 10a to be adjusted.

The middle portions of the stays 20 in pairs are joined to a baseplate 22 by fastening nuts 21, providing a structure where the top ends of the stays 20 project from the baseplate 22 upward. The above headrest body 10a is attached to respective projecting ends 20a of the stays 20 projecting from the baseplate 22.

Re. Structure of Headrest Body

According to this embodiment, the headrest body 10a includes left and right headrest members 11, 12 adjoining each other at a substantial center of the headrest apparatus 10 in the left-and-right direction of the vehicle and a sheet 13 which is arranged to spread between separation ends 11a, 12a of the headrest members 11, 12.

In opposite to the separation ends 11a, 12a, the left and right headrest members 11, 12 have respective ends 11b, 12b rotatably attached to the stays 20 through rotating-and-urging mechanisms 30 for rotating and urging the members 11, 12 forward about the vehicle (this side of figure).

In the left and right headrest members 11, 12, each rectangular framework is formed by an upper transverse arm 14, a lower transverse arm 14a, a vertical arm 15 connecting respective ends of the transverse arms 14, 14a (on the side of the separation ends 11a, 12a) with each other and an outer cylinder 16 connecting the other ends of the transverse arms 14, 14a (on the side of the opposite ends 11b, 12b) with each other. These frameworks of the headrest members 11, 12 are covered with cushion pads 10b.

The sheet 13 is formed with a predetermined length (e.g. 30 cm) and includes respective longitudinal ends attached to the vertical arms 15 of the left and right headrest members 11, 12. Each cushion pad 10b is provided, on a terminal thereof, with an elongated opening 10c which allows the sheet 13 to pass therethrough.

Each outer cylinder 16 is fitted on an inner cylinder 17, rotatably and slidably in the axial direction. The inner cylinder 17 is fixed to the outside of the lower part of the projecting end 20a of the stay 20. In this way, the left and right headrest members 11, 12 are adapted so as to open and close in a manner of casement windows, about the inner cylinders 17 as pivots. When the left and right headrest members 11, 12 are pushed and opened at the maximum degree, the respective vertical arms 15 are projected forward to define a constant interval in the left-and-right direction. The sheet 13 is constructed so as to stretch between the vertical arms 15 defining such a constant interval.

Figure 4:
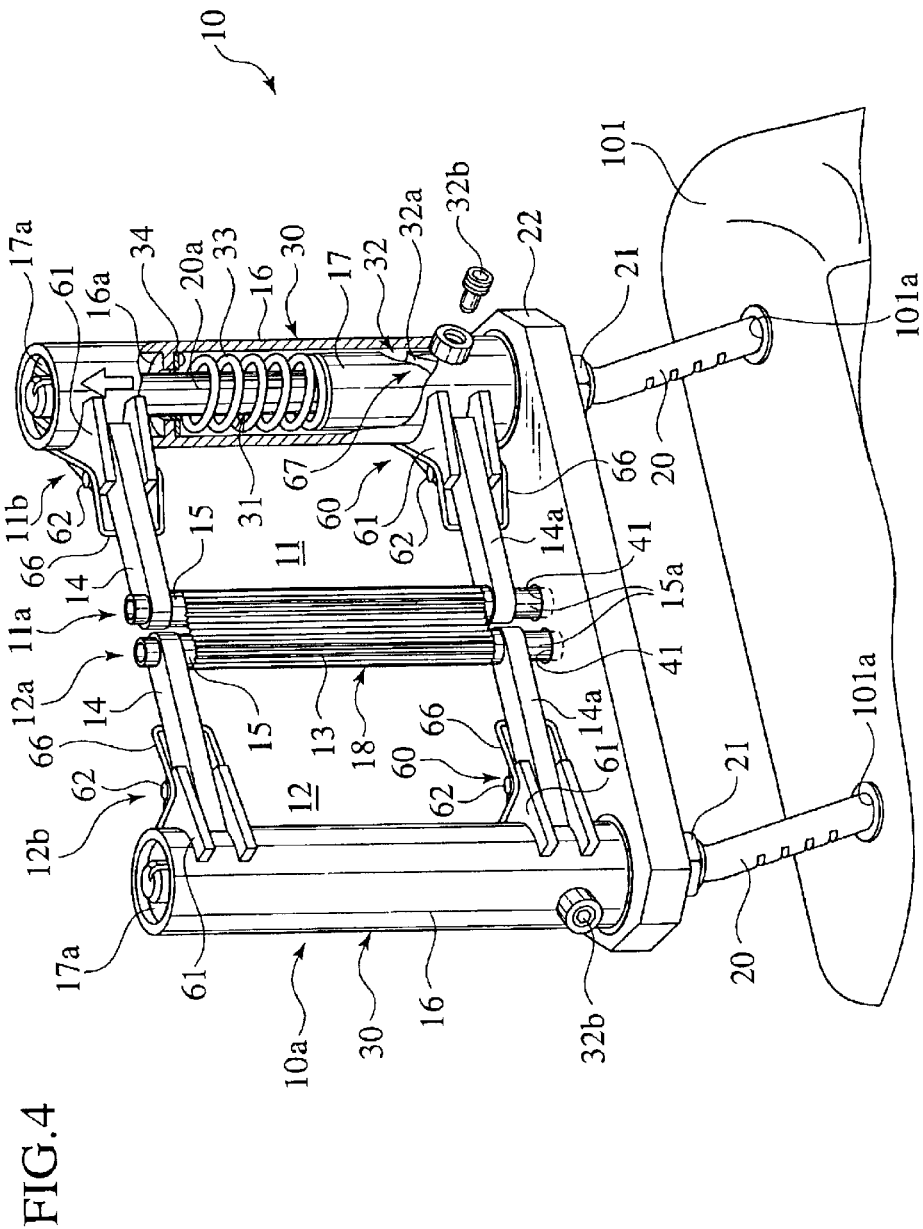
FIG. 4 is an enlarged perspective view showing an interior of the headrest apparatus of the first embodiment.

Between the left and right headrest members 11, 12, there is provided a housing part 18 which accommodates the sheet 13 when the members 11, 12 occupy their initial positions, in other words, the transverse arms 14, 14 and 14a, 14a are in substantial-straight lines, as shown in FIGS. 1 and 4. According to this embodiment, it is noted that the sheet 13 is accommodated in the housing part 18 while being folded like a bellows.

As shown in FIG. 4, a brim-shaped end plate 17a is fixed to the top of the projecting end 20a of each stay 20. Each outer cylinder 16 has its upper end engaged with the periphery of the end plate 27a rotatably and slidably in the axial direction. Thus, the upper ends of the outer cylinders 16 are respectively supported by the peripheries of the end plates 17a.

Re. Rotating-and-Urging Mechanism

The rotating-and-urging mechanisms 30 each includes a lifting mechanism 31 for elevating the left (or right) headrest member 11 (12) with respect to the stay 20 and a rotating mechanism 32 for rotating the left (or right) headrest member 11(12) forward about the vehicle, corresponding to the rising operation of the lifting mechanism 31.

As shown in FIG. 4, the lifting mechanism 31 has a spring 33 shrunk between the top end of the inner cylinder 17 and an annular small-diameter part 16a formed in integral with the upper part of the outer cylinder 16. A washer 34 is interposed between the spring 33 and the small-diameter 16a, for improvement of slipping therebetween.

That is, owing to the provision of the springs 33, the outer cylinders 16, namely, the left and right headrest members 11, 12 are subjected to urging forces for usually thrusting up the members 11, 12.

As shown in FIG. 4, the rotating mechanism 32 is formed by a spiral groove 32a formed on the periphery of the inner cylinder 17 and a bolt 32b screwed into the outer cylinder 16, for engagement with the groove 32a. The spiral groove 32 is formed to incline in a direction to rotate the left headrest member 11 (or the right headrest member 12) forward as directing upward. The bolt 32b is slidably engaged in the spiral groove 32a.

Therefore, when the left and right headrest members 11, 12 are lifted upward by the springs 33 by the lifting mechanism 31, the bolts 32b of the rotating mechanisms 32 rise along the spiral grooves 32a of the inner cylinders 17, so that the outer cylinders 16 in integral with the bolts 32b are rotated in respective directions to open the left and right headrest members 11, 12 forward. Accordingly, corresponding to the profile of each spiral groove 32a, namely, its inclination angle, it is possible to establish the rotating extent of the left and right headrest members 11, 12 optionally. That is, the spiral grooves 32a form adjustment mechanisms 67 to adjust the rotating extent of the left and right headrest members 11, 12 with respect to their rising amounts.

Locking Unit and Control Unit

As shown in FIGS. 5 to 8, a locking unit 40 is arranged between the vertical arms 15 of the left and right headrest members 11, 12 and the baseplate 22, for holding the members 11, 12 at their initial positions in opposition to an urging force of the rotating-and-urging mechanism 30. Further, according to the embodiment, there is provided a control unit 50 which detects a rear-end collision of an automobile M to release the locking unit 40, as shown in FIG. 9.

Figure 5:
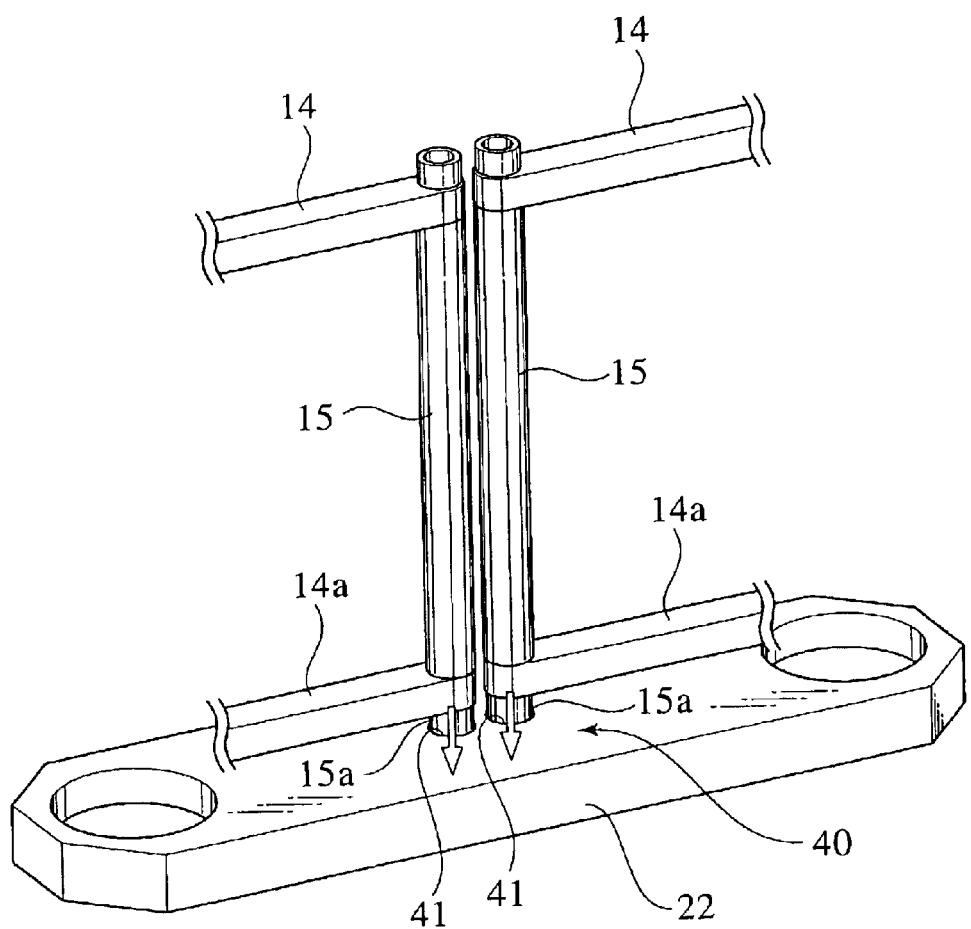
FIG. 5 is a perspective view of an essential part of a headrest body of the headrest apparatus of the first embodiment, showing a condition that the headrest body is engaged by a locking mechanism.
Figure 6:
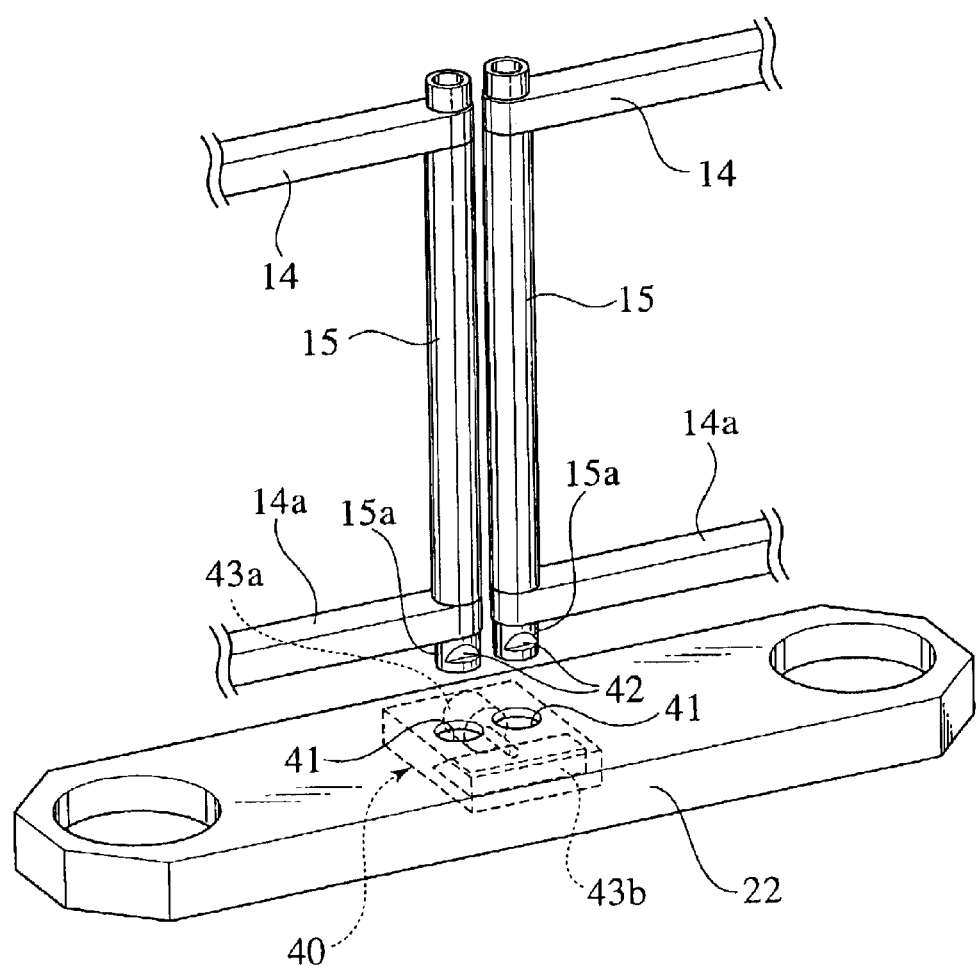
FIG. 6 is a perspective view of the essential part of the headrest body of FIG. 5, showing a condition that the locking mechanism is released.

As shown in FIGS. 5 to 8, the locking unit 40 includes engagement holes 41 for inserting the lower ends 15a of the vertical arms 15 of the members 11, 12 into the baseplate 22 and a solenoid mechanism 43 arranged in the baseplate 22 to be engageable with notches 42 on the lower ends 15a of the vertical arms 15. As shown in FIGS. 5 and 6, the engagement holes 41 in pairs are formed in the vicinity of the middle part of the baseplate 22.

Figure 7:
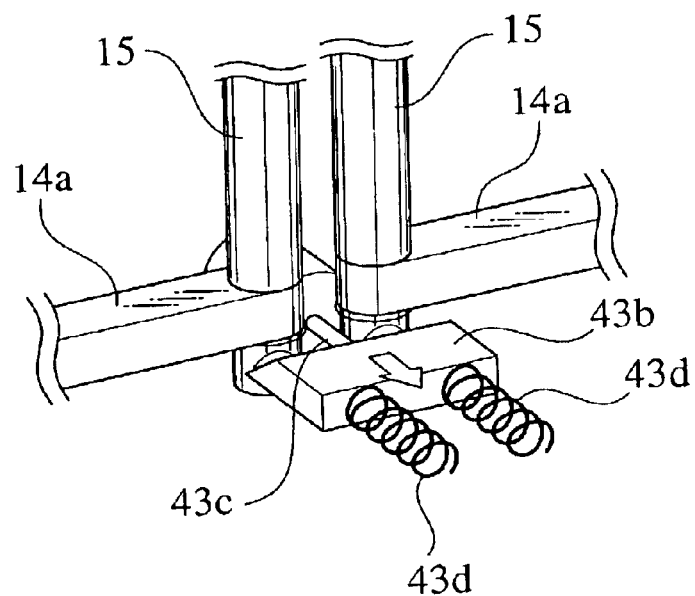
FIG. 7 is a perspective view of the locking mechanism of the first embodiment of the invention.
Figure 8:
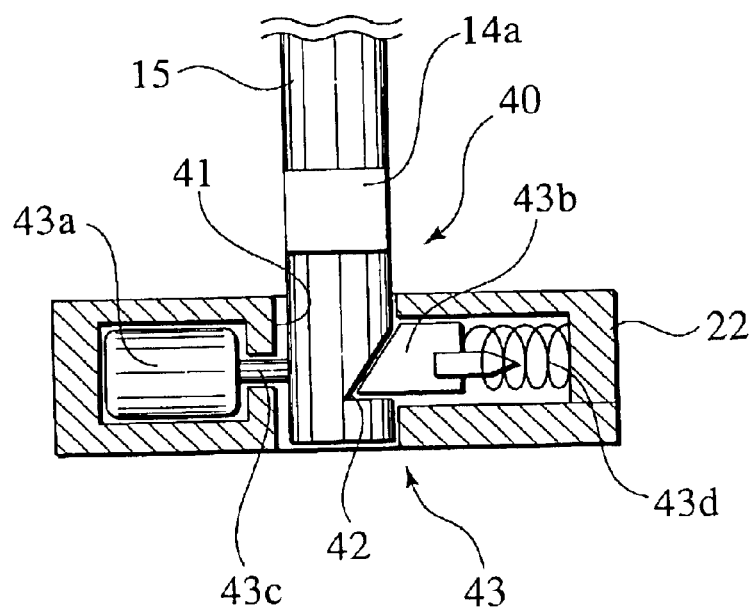
FIG. 8 is a sectional view of the locking mechanism of FIG. 7.
Figure 9:
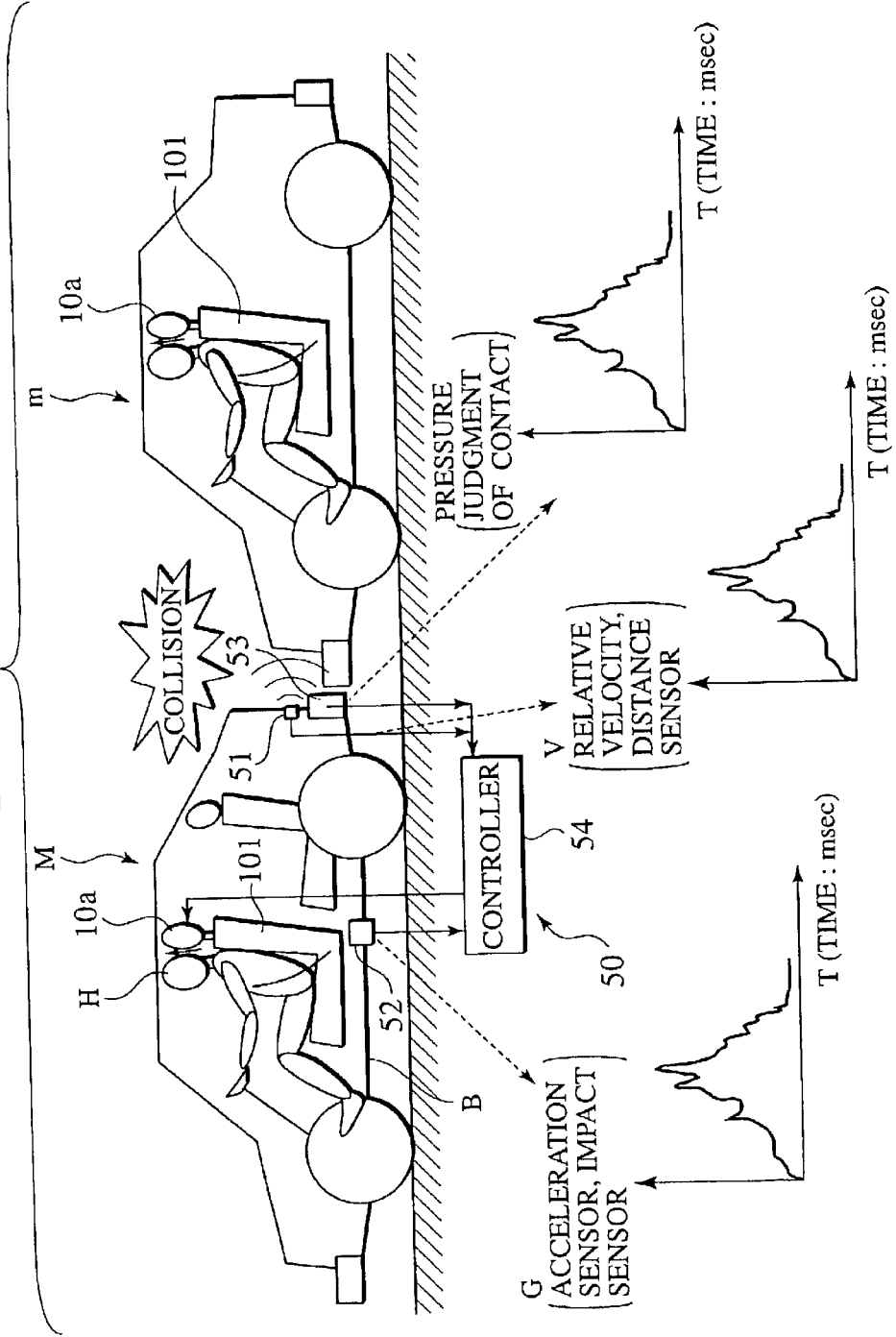
FIG. 9 is an explanatory view of an operation system of a controller of the first embodiment of the invention.

As shown in FIGS. 7 and 8, the solenoid mechanism 43 is generally formed by a solenoid 43a accommodated in the baseplate 22 and positioned on one side of the engagement holes 41 in the fore-and-aft direction of the vehicle and a locking claw 43b arranged on the other side of the engagement holes 41, for engagement with the notches 42.

The solenoid 43 has a rod 43c that projects by the application of current. The locking claw 43b is connected with the leading end of the rod 43c. The locking claw 43b is always urged into a direction to engage with the notches 42, by a pair of springs 43d.

Thus, in the normal condition where the solenoid 43 is not powered, the left and right headrest members 11, 12 are depressed in opposition to upward force by the springs 33 to insert the lower ends 15a of the vertical arms 15 into the engagement holes 41. Then, the lower ends 15a of the vertical arms 15 once depress the locking claw 43b and thereafter, the arms 15 are engaged with the locking claw 43b through the notches 42, realizing the locking condition.

In FIG. 9, the control unit 50 includes a V-sensor 51 arranged on the rear side of the passenger's vehicle M to detect a relative velocity of the following vehicle m by means of sound wave etc., a G-sensor 52 for detecting an acceleration applied to a vehicle body B, a pressure sensor 53 attached to a rear bumper to detect a contact pressure between the passenger's vehicle and the following vehicle m and a controller 54 inputting respective signals of the above sensors. Upon detection of the rear-end collision on the ground of the detection signals from the sensors 51, 52, 53, the controller 54 operates to supply the solenoid 43a with current thereby to release the locking unit 40 from its locked state. Note, although the G-sensor 52 and the pressure sensor 53 form means for detecting the vehicle collision substantially, these sensors may be replaced with a touch sensor, a strain gauge or the like (all not shown in the figures).

Fixing Mechanism

According to this embodiment, each rotating mechanism 32 is provided with a fixing mechanism 60 that fixes the left (or right) headrest member 11 (12) on the side of the stay 20 when a rearward pressure is applied on the same member 11 (12).

Figure 10:
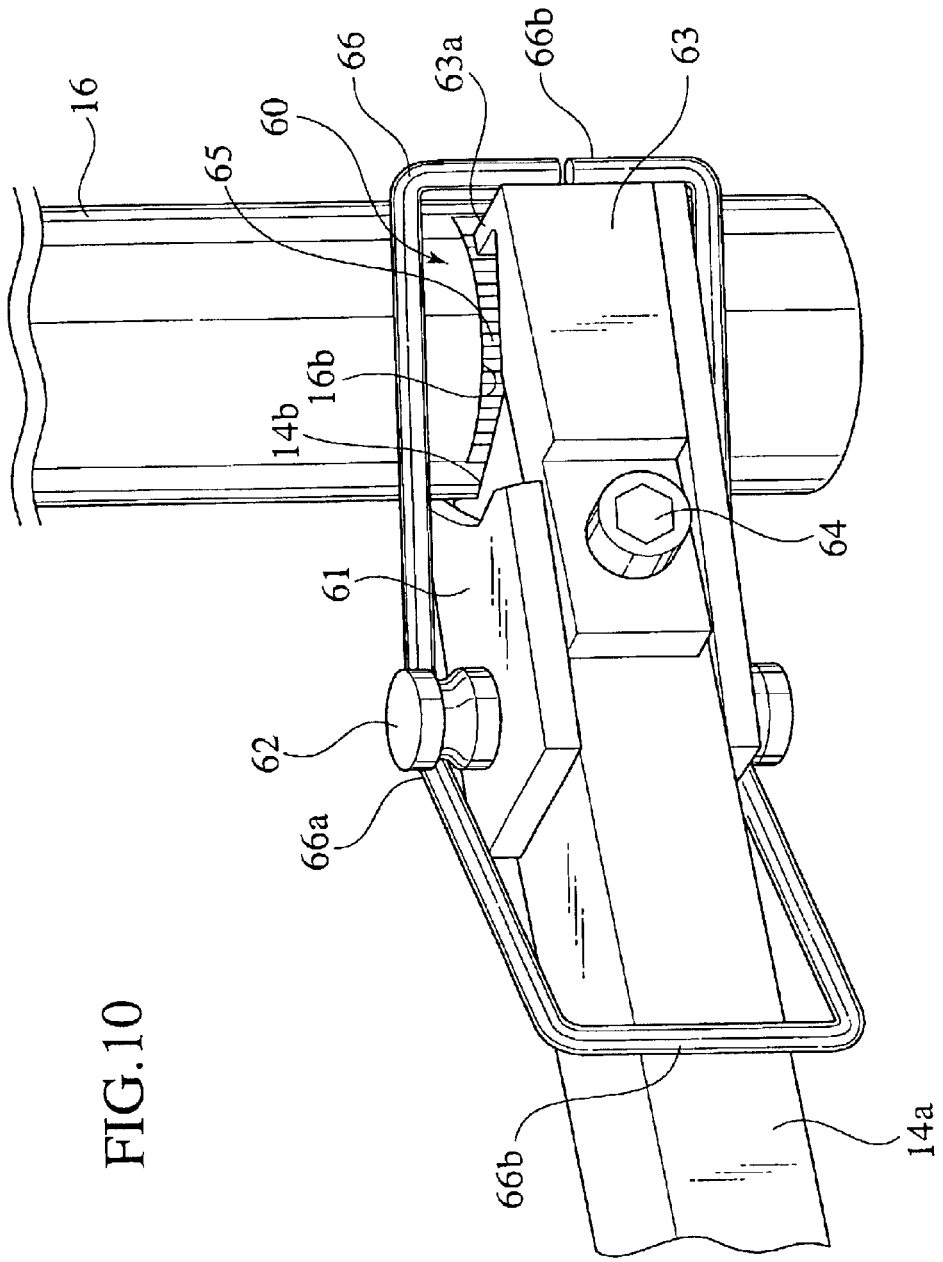
FIG. 10 is a rear perspective view of a fixing mechanism of the first embodiment of the invention.
Figure 11:
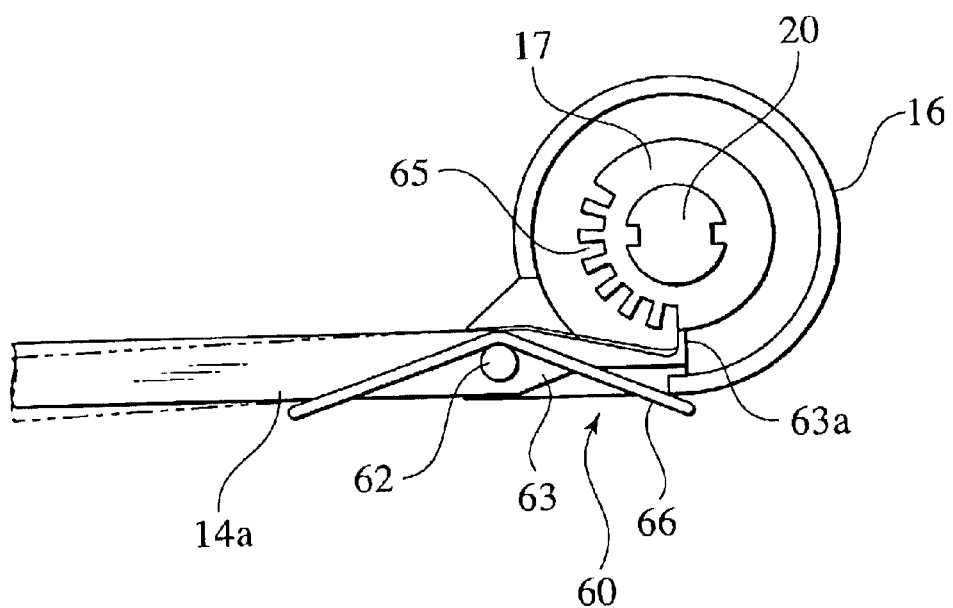
FIG. 11 is a sectional view of an essential part of the fixing mechanism of FIG. 10.

As shown in FIGS. 4, 10 and 11, the upper and lower transverse arms 14, 14a of the headrest members 11, 12 are separated from the outer cylinders 16. Through pins 62, the so-separated transverse arms 14, 14a are connected to brackets 61 secured with the outer cylinders 16, so as to be rotatable in the fore-and-aft direction, providing relatively-rotating parts.

An engagement member 63 that projects up to the substantial center of each outer cylinder 16 is fixed to the separation end of each lower transverse arm 14a through a bolt 64. The outer cylinder 16 is provided with a window 16b through which a claw 63a of the engagement member 63 passes.

On the other hand, each inner cylinder 17 is provided, at its peripheral part corresponding to the window 16b, with a rack 65 which consists of a plurality of teeth formed in the circumferential direction, for engagement with the claw 61a of the engagement member 63. The rack 65 is formed so as to stretch the full length of the inner cylinder 17.

Arranged between each of the transverse arms 14, 14a and the outer cylinder 16 is a spring 66 which forms an urging unit and urges the transverse arm 14 (14a) forward, as shown in FIG. 10. The spring 66 can be produced by the following steps of: firstly forming a wire material made of spring steel so as to be generally rectangular; and secondly bending a pair of opposing sides to be V-shaped.

In the spring 66, a V-shaped bending part 66a is engaged with the front side of the pin 62, providing a fulcrum. One end 66b of the spring 66 is engaged with the rear side of the transverse arm 14 (14a), while the other end 66c is engaged with the rear side of the outer cylinder 16. With these engagements, the spring 66 is adapted so as to exert a forward urging force between the end 66b and the other end 66c.

Thus, as shown with broken lines of FIG. 12, the fixing mechanisms 32 are normally under the condition that the transverse arms 14, 14a are respectively rotated forward about the pins 62 by the urging forces of the springs 66, while the claws 63a of the engagement members 63 are respectively separated from the racks 65 so that the outer cylinders 16 can rotated with respect to the inner cylinders 17. Note, as shown in FIG. 12, the rotating amount of each transverse arm 14 (14a) about the pin 62 is established within a small range defined between the following states: one is that one edge of a V-shaped recess 14b formed on the separation end of the transverse arm 14 (14a) comes into contact with the periphery of the outer cylinder 16; and the other edge of the recess 14b comes into contact with the periphery of the outer cylinder 16.

When the left and right headrest members 11, 12 are subjected to backward force since a passenger's head H comes in touch with the members 11, 12, the transverse arms 14, 14a are rotated backward in opposition to the urging forces of the springs 66, so that the claws 63a of the engagement members 63 are engaged in the racks 65 respectively. Consequently, the outer cylinders 16 are locked in the inner cylinders 17 respectively.

Operation

According to the above-constructed headrest apparatus 10 of this embodiment, as shown in FIG. 9, when the vehicle M has a rear-end collision with the following vehicle m, the collision is detected by the V-sensor 51, the G-sensor 52, the pressure sensor 53, not-shown touch sensor, strain gauge, etc. and thereafter, the controller 54 supplies the solenoid 43a of the locking unit 40 with current.

In the controller 54, the operation is carried out in accordance with the flow chart of FIG. 14. First of all, at step S1, the control of the headrest apparatus 10 is started by the passenger's manipulation to activate an ignition switch on. At this time, the solenoid 43a is supplied with no current (which will be referred "solenoid current", hereinafter).

At step S2, it is executed to detect the following vehicle m by the detection signal of the V-sensor 51 and then, the routine goes to step S3. At step S3, it is executed to calculate a relative distance S between the passenger's vehicle M and the following vehicle m. At next step S4, it is executed to calculate a relative velocity ΔV between the passenger's vehicle M and the following vehicle m.

Figure 15:
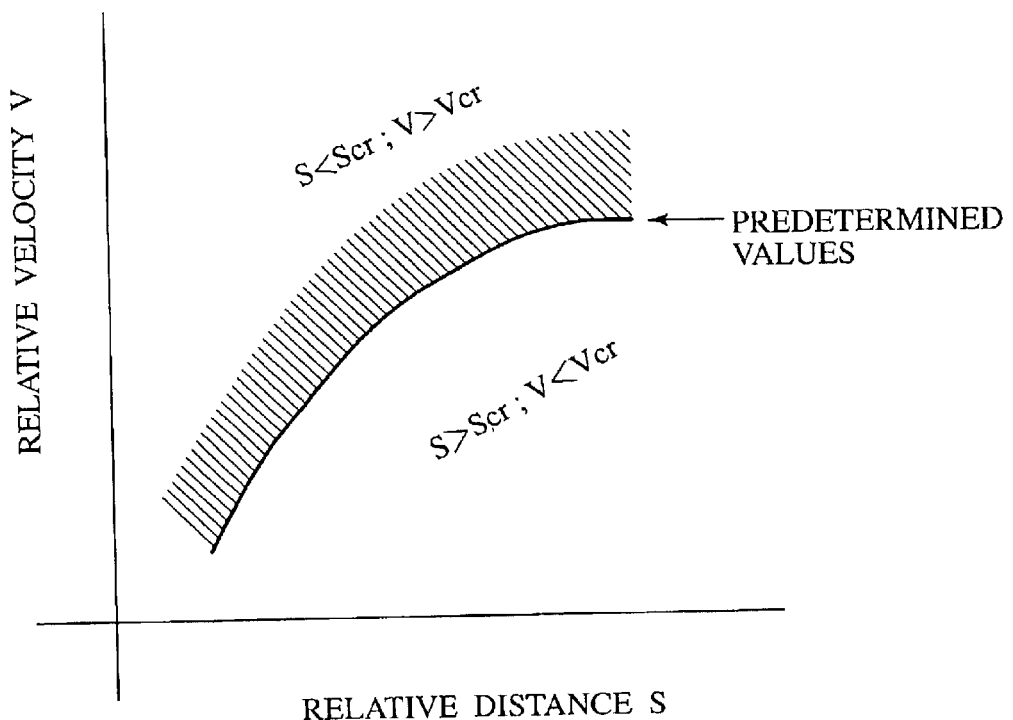
FIG. 15 is an explanatory diagram showing an operative area to release the locking mechanism of the first embodiment of the invention.

At next step S5, on the ground of a control map of FIG. 15, it is executed to calculate the relationship between the relative distance S of step S3 and a predetermined relative distance Scr and also the relationship between the relative velocity ΔV of step S4 and a predetermined relative velocity ΔVCr. As a result of calculation, when there are established both of conditions of (S<Scr) and (V>Vcr), it is expected that the following vehicle m may collide with the passenger's vehicle M and then, the routine goes to step S6. To the contrary, if not establishing the above conditions, then the routine returns to step S2.

At step S6, it is executed to supply the solenoid 43a of the locking unit 40 with a current smaller than a regular solenoid current (maximum current), thereby enhancing the operative response of the solenoid 43a in advance.

At sequent step S7, it is detected that the vehicle M has a rear-end collision actually, by means of any one of the V-sensor 51, the G-sensor 52, the pressure sensor 53, not-shown touch sensor and strain gauge. At step S8, the regular solenoid current is supplied to the solenoid 43a, so that the locking unit 40 is released.

That is, when the locking unit 40 is released, the locking claw 43b is apart from the notches 42 of the vertical arms 15, so that the lower ends 15a slip out of the engagement holes 41 of the baseplate 33 due to the upward force of the springs 33.

Figure 13A:
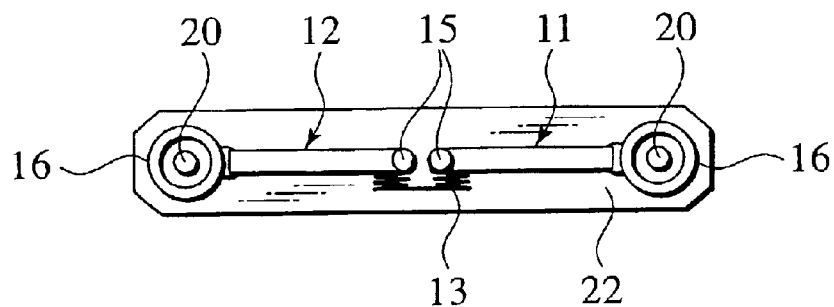
FIGS. 13A, 13B and 13C are schematic explanatory views sequentially showing the operation of the headrest apparatus of the first embodiment of the present invention.
Figure 13B:
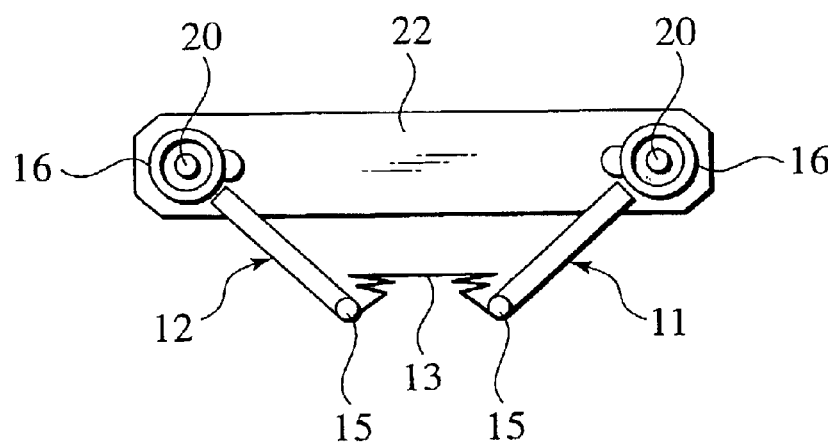

Consequently, the left and right headrest members 11, 12 are elevated from their initial positions (see FIG. 13A) due to the upward force of the springs 33. Then, since the bolts 32b of the cylinders 16 move along the spiral grooves 32a of the inner cylinders 17, the left and right headrest members 11, 12 are rotated forward, as shown in FIG. 13B. When the outer cylinders 16 moves up furthermore, the small-diameter parts 16a abut against the end plate 17a of the stays 20. Then, the rising of the outer cylinders 16 are stopped, so that the left and right headrest members 11, 12 occupy their positions with the maximum rotating amounts shown in FIG. 13C.

Figure 13C:
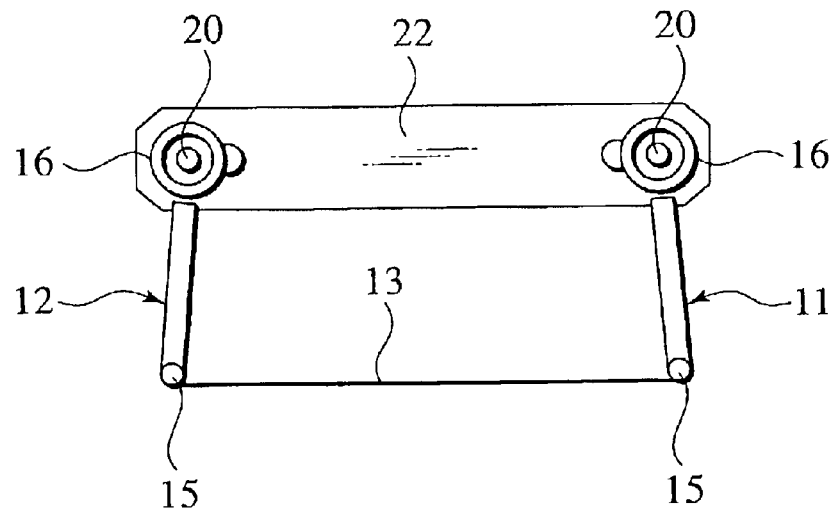

With the forward rotation of the left and right headrest members 11, 12, the sheet 13 between the vertical arms 15 is withdrawn out of the housing parts 18 and unfolded under tension at the maximum rotating amount of FIG. 13C. In this way, since the sheet 13 is pushed upward and forward, it becomes possible to immediately catch and restrict the passenger's head H being moved backward by inertia due to the vehicle rear-end collision.

According to the embodiment, since the left and right headrest members 11, 12 are rotated forward to push the sheet 13 at the vehicle rear-end collision, it is possible to accomplish the certain and prompt push-out of a head-restricting part, i.e., the sheet 13 in comparison with the conventional apparatus adapted to push the whole headrest body under the same situation. Therefore, the immediate restriction for the passenger's head H can be accomplished with enhanced restricting performance of the headrest apparatus.

In addition, since the headrest apparatus of this embodiment does not detect a load change due to the inertia of the passenger but detects the vehicle rear-end collision of the vehicle M by means of the V-sensor 51, the G-sensor 52, the pressure sensor 53 and so on, it is possible to certainly and promptly actuate the headrest body 10a irrespective of weight and posture of the passenger. Accordingly, since a mechanism for detecting the load change of the passenger is not required for the seat-back 101, it can make sure of its inherent comfortability to sit on without being restricted by the dimensions of width and height, configuration, etc. Further, it is possible to provide the seat 100 itself with lightweight structure.

Furthermore, with the result that the left and right headrest members 11, 12 are simultaneously subjected to rising by the lifting mechanisms 31 and rotation by the rotating mechanisms 32 at the vehicle rear-end collision, the left and right headrest members 11, 12 are opened forward while being urged upward. Therefore, even when the body part of the passenger is raised along the seat-back 101 at the vehicle rear-end collision, it is possible to prevent the back of the passenger's head from running on to the sheet 13, performing the restriction of the head H surely.

Additionally, when the left and right headrest members 11, 12 are at respective initial positions, the sheet 13 is accommodated in the housing parts 18. Thus, the sheet 13 can be housed compactly to improve both outward appearance and head-resting function of the apparatus.

Further, since the sheet 13 is accommodated in the housing parts 18 in a folding manner, the housing form allows the sheet 18 to be housed compactly and unfolded smoothly. Thus, the prompt restriction for the passenger's head H can be carried out to enhance its safety.

Meanwhile, owing to the provision of the fixing mechanisms 60 each having the engagement member 63 and the rack 65, when the left and right headrest members 11, 12 are rotated forward and interfere with the passenger's head H, they are subjected to rearward force, so that the fixing mechanisms 60 fix the members 11, 12 on the side of the stays 20. Consequently, it is possible to prevent the members 11, 12 from pushing back the passenger's head H forward. Additionally, it is also possible to prevent the members 11, 12 from being urged backward by the head H.

Further, owing to the provision of the fixing mechanisms 60 with the springs 66, when the left and right headrest members 11, 12 interfere with the passenger's head H, such an impact on the head H can be softened by the springs 66 although the members 11, 12 are moved slightly backward in opposition to the urging forces of the springs 66.

Since each of the rotating-and-urging mechanisms 30 is capable of adjusting the rotating amount of the member 11 (12) with respect to its rising amount due to cooperation of the lifting mechanism 31 and the adjusting mechanism 67, it is possible to optionally adjust the surface tracks of the sheet 13 in compliance with the position of the passenger's head H shifting backward at the vehicle rear-end collision, whereby the head H can be restricted surely.

In detail, the rotating amount of each headrest member 11 (12) with respect to its rising amount can be easily adjusted by selecting an inclination angle of the spiral groove 32a of the adjusting mechanism 67.

With the structure where the left and right headrest members 11, 12 are opened or closed since the bolts 32b move in the spiral grooves 32a, if depressing the left and right headrest members 11, 12, then the bolts 32b move in the spiral grooves 32a downward, whereby the members 11, 12 can be closed. That is, owing to the reversible structure of the bolts 32b and the spiral grooves 32a, the headrest apparatus of the embodiment can be used repeatedly by returning the left and right headrest members 11, 12 to the initial positions. It means that the invention can provide the headrest apparatus 10 at low cost.

Figure 16:
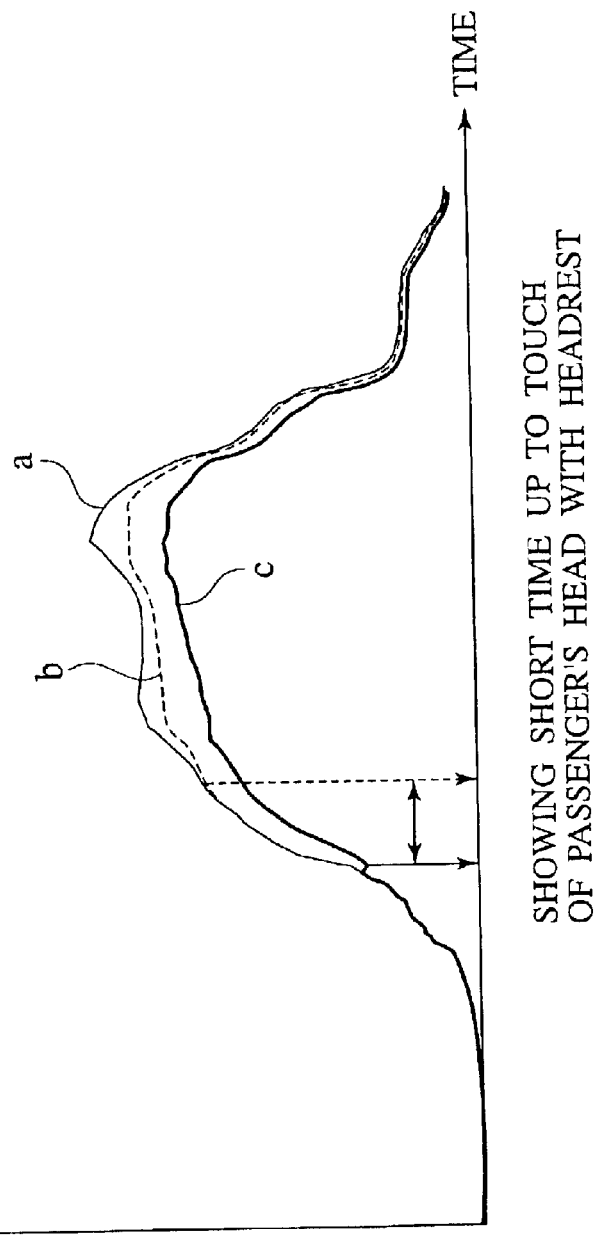
FIG. 16 is a comparative diagram showing the characteristics of the headrest apparatus of the first embodiment of the invention and the prior art apparatus with respect to a moment under the neck.

FIG. 16 is a comparative diagram showing the characteristics of the headrest apparatus 10 of this embodiment of the invention. In the figure, a transverse axis represents time, while a vertical axis represents moment (load) applied on the passenger's neck. In this figure, "a" designates the fixed type headrest, "b" designates the movable type headrest that detects the vehicle collision by making use of load movement due to the passenger's inertia, and "c" designates the headrest apparatus of this embodiment.

From this diagram, it will be understood that the headrest apparatus 10 of "c" is quick in terms of contact time with the passenger's head and reduces the moment load applied on the head.

Other Examples about Control

In the above-mentioned embodiment, the controller 54 is operated in accordance with the flow chart of FIG. 14. In the modification, the releasing of the operation of the locking unit 40 by controller 54 may be controlled by a flow chart of FIG. 17 or FIG. 18. Now, we describe the flow charts of FIGS. 17 and 18. Note, in these figures, processes identical to those of the flow chart of FIG. 14 are indicated with the same step numbers respectively and their descriptions of the processes are eliminated.

Figure 17:
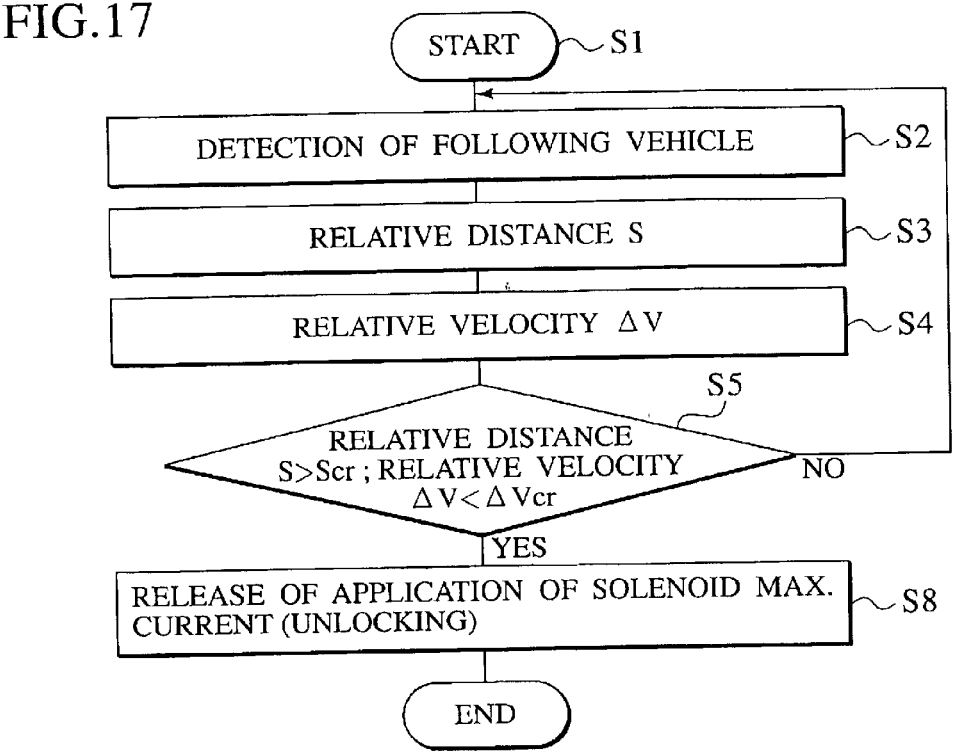
FIG. 17 is another flow chart to control the locking mechanism of the first embodiment of the invention.

In the flow chart of FIG. 17, the processes at steps S7 and S8 of FIG. 14 are eliminated. Therefore, if the judgment at step S5 is Yes, that is, under expectation of the rear-end collision, the routine goes to step S8 where the regular solenoid current (maximum) is supplied to the solenoid 43a.

In this case, the prompt control can be accomplished with reduction in the number of processes. Further, since the solenoid current is supplied at a point of time of expecting the rear-end collision, it is possible to realize a condition to hold the passenger's head just before the rear-end collision. Additionally, with the abolition of various sensors for detecting the actual rear-end collision, it is also possible to reduce the manufacturing cost.

Figure 18:
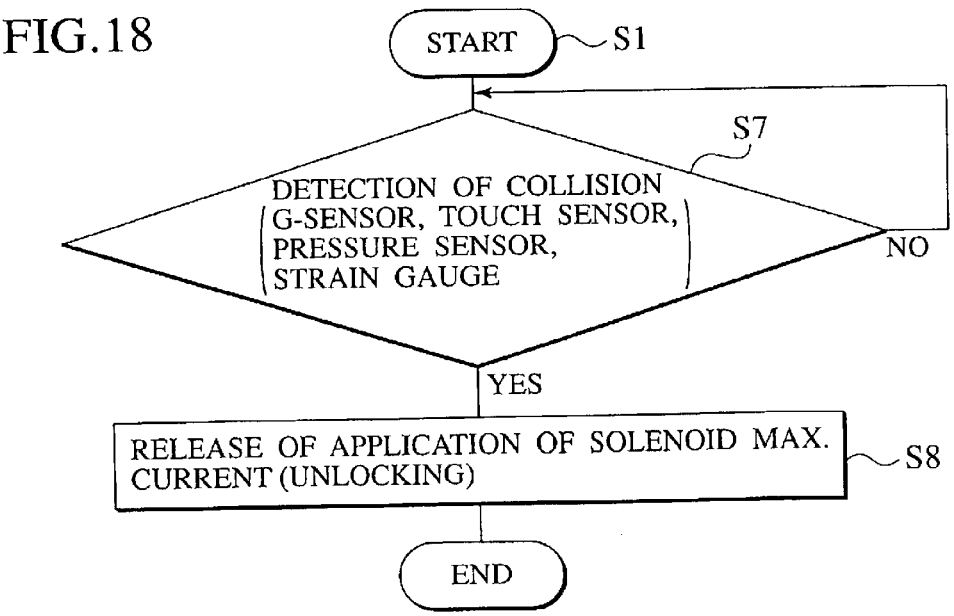
FIG. 18 is a further flow chart to control the locking mechanism of the first embodiment of the invention.

The above operation is further simplified by the flow chart of FIG. 18. According to this modification, after detecting the actual rear-end collision at step S7, it is executed to supply the regular solenoid current at step S8.

Consequently, it is possible to simplify the structure of the controller 54 with reduction in manufacturing cost.

In this embodiment, the left and right headrest members 11, 12 of the head rest body 10a are rotated and urged forward about the vehicle by the rotating-and-urging mechanisms 30 in a condition that the left and right headrest members 11, 12 are held at their initial positions by the locking unit 40. At the rear-end collision of the vehicle, the locking unit 40 is released by the control unit 50, so that the left and right headrest members 11, 12 are rotated forward about the vehicle. Thus, the separation ends of the left and right headrest members 11, 12 are thrust forward about the vehicle, so that the sheet 13 stretched between the separation ends is opened to hold the passenger's head.

Consequently, a head hold part, namely the sheet, can be surely and rapidly thrust in comparison with the case that the whole headrest body is thrust. Thus, the passenger's head can be quickly held, so that the performance of the headrest apparatus can be improved.

Further, the left and right headrest members 11, 12 are simultaneously lifted by the lifting mechanism 31 and rotated by the rotating mechanism 32, so that the left and right headrest member's are thrust and opened forward about the vehicle with lifted upward. Accordingly, when the body of the passenger are lifted along the seatback at the rear-end collision, the passenger's head can be kept from taking over the opened sheet, so that the passenger's head can be surely held.

The left and right headrest members 11, 12 are rotated forward about the vehicle so that the sheet 13 can be unfolded from the housing part 18 to hold the passenger's head. Consequently, the sheet 13 is housed in the housing part 18 when the left and right headrest members 11, 12 are at their initial position, thus the sheet can be compactly housed so that the appearance and headrest performance can be improved.

Further, since the sheet 13 is housed under condition that it is being folded, the sheet 13 can be further compactly housed in the housing part 18 as well as the sheet 13 can be smoothly opened.

Further, when the passenger's head interferes the left and right headrest members 11, 12 rotating forward about the vehicle, a backward pressure is applied to the left and right headrest members 11, 12, so that the left and right headrest members 11, 12 are fixed to the stay 20. Thus, the passenger's head is kept from being thrust by the left and right headrest members 11, 12, while the left and right headrest members 11, 12 are prevented from being moved backward by the passenger's head.

Moreover, when the passenger's head interferes the left and right headrest members 11, 12 rotating forward about the vehicle, the left and right headrest members 11, 12 are slightly moved backward against the urging force of the urging unit 66. At this time, a shock to the passenger's head is absorbed by the urging force of the urging unit 66.

Further, since a rotating amount of the left or right headrest member 11, 12 can be adjusted with respect to a rising amount thereof optionally by the cooperation of the adjustment mechanism 67 and a lifting mechanism 31, the face of the sheet 13 can be adjusted to the position of the passenger's head moving backward at the rear-end collision, thus the passenger's head can be surely held.

[2nd. Embodiment]

FIGS. 19 to 22 shows the second embodiment of the invention. In this embodiment, elements similar to those of the first embodiment are indicated with the same reference numerals respectively and their overlapping descriptions are eliminated.

As similar to the first embodiment, the vehicle headrest apparatus 10 of the second embodiment has the headrest body 10a formed by the left and right headrest members 11, 12. The left and right headrest members 11, 12 are provided, on the separation ends 11a, 12a, with the vertical arms 15. According to this embodiment, the left and right headrest members 11, 12 are provided, on the opposite ends 11b, 12b, with vertical arms 19.

That is, in the left and right headrest members 11, 12, each rectangular framework is formed by the upper transverse arm 14, the lower transverse arm 14a, the vertical arm 15 and the vertical arm 19.

Further, the left and right headrest members 11, 12 each includes a single connecting arm 19a formed to project from the intermediate part of the vertical arm 19 outward. Thus, the left and right headrest members 11, 12 are connected to the outer cylinders 16 through the connecting arms 19a, respectively. Note, the connecting arms 19a are adapted so as to be slightly rotatable with respect to the outer cylinder 16 in the fore-and-aft direction of the vehicle and also urge the left and right headrest members 11, 12 forward by means of the springs 66.

Meanwhile, the locking unit 40 of the second embodiment is constructed so as to directly lock both rising and rotating operations of the outer cylinders 16 through a link mechanism 46 having a solenoid 45.

Figure 19:
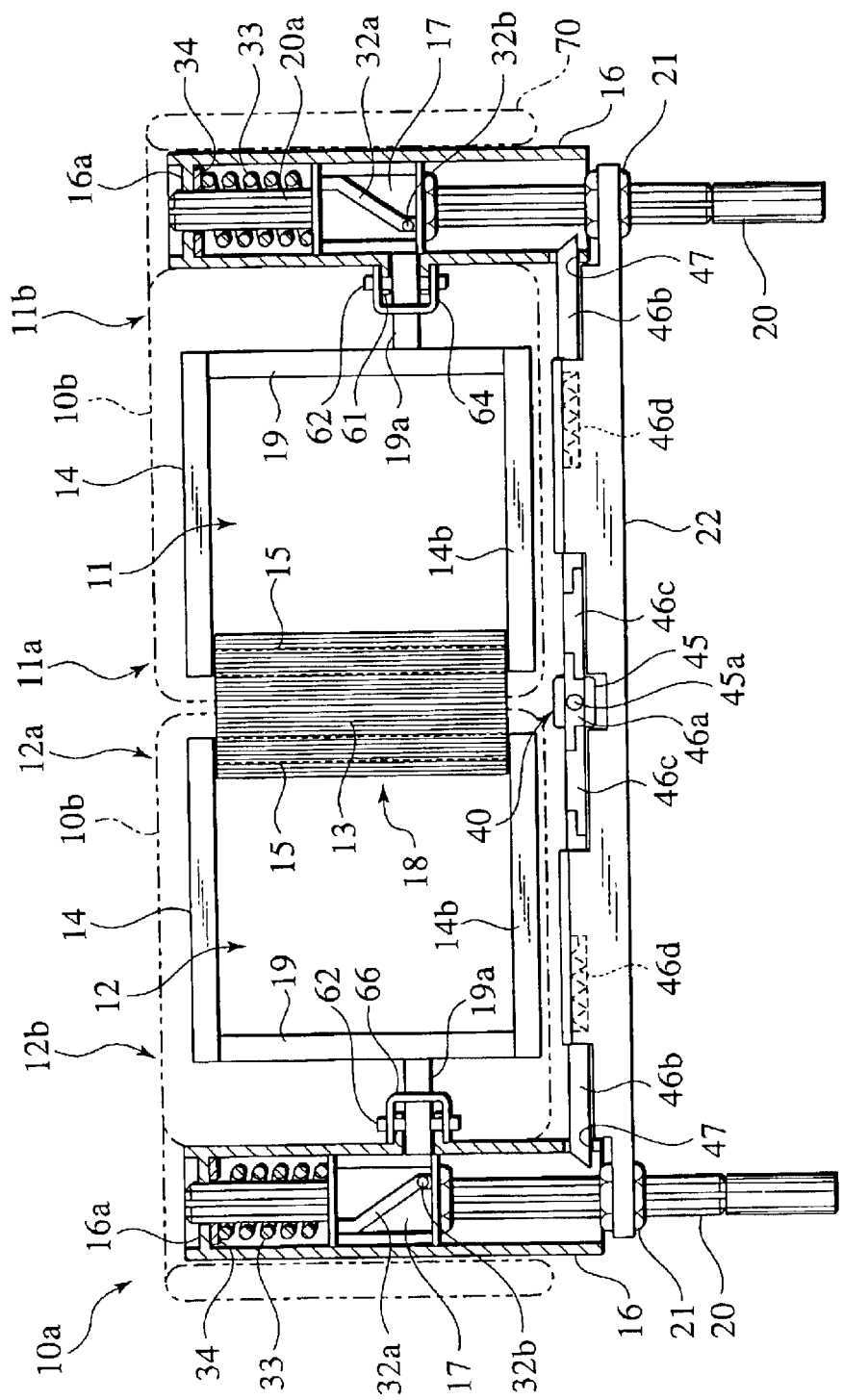
FIG. 19 is a front view showing a condition that a sheet body of the headrest apparatus of the second embodiment is accommodated.
Figure 20:
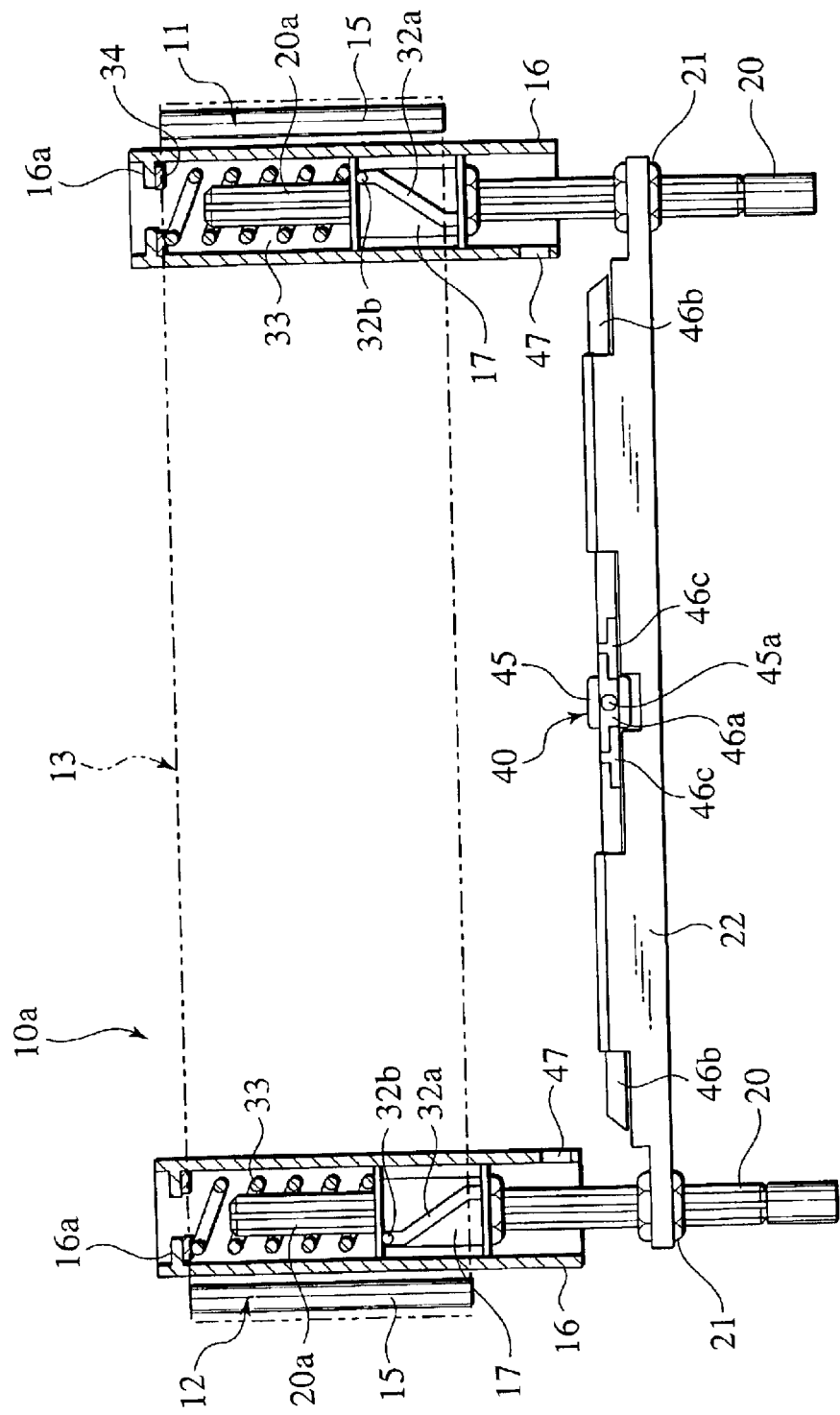
FIG. 20 is a front view showing a condition that the sheet body of the headrest apparatus of FIG. 19.
Figure 21:
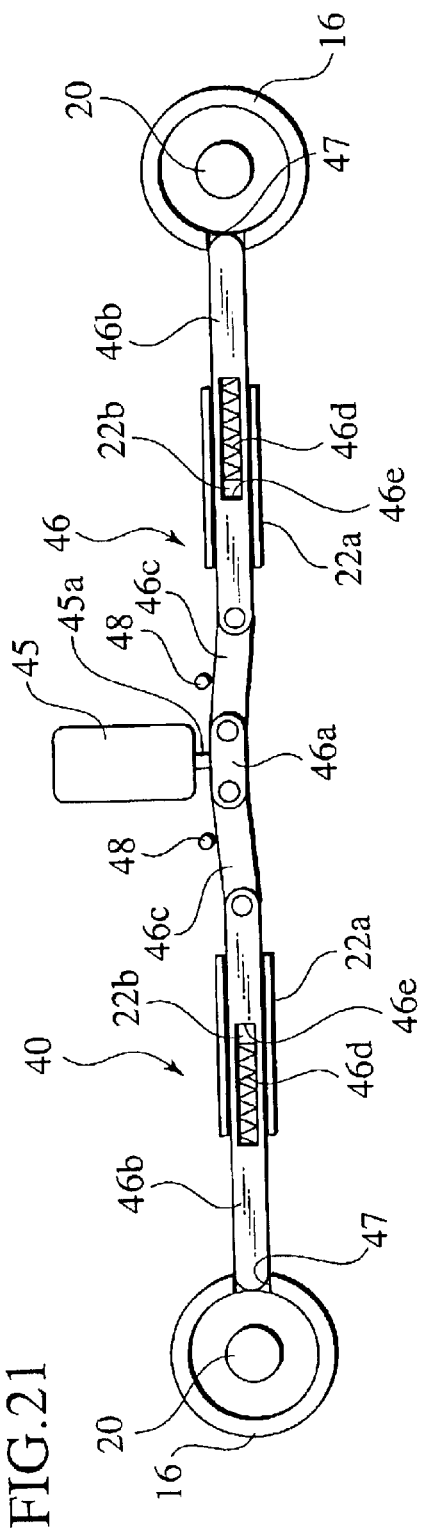
FIG. 21 is a plan view showing the locking mechanism in its locked condition in accordance with the second embodiment of the invention.

As shown in FIGS. 19 and 21, the solenoid 45 is arranged at the center of the baseplate 22 and has a rod 45 projecting forward. As similar to the previous embodiment, the application of current allows the solenoid 45 to project the rod 45a forward.

The link mechanism 46 is arranged along the longitudinal direction of the baseplate 22, that is, a left-and-right direction and includes a center link 46a having its rear face on which the leading end of the rod 45a abuts, a pair of end links 46b, 46b positioned on both sides of the baseplate 22 in the longitudinal direction and also guided by left and right guide parts 22a on the baseplate 22, and a pair of connecting links 46c, 46c rotatably connecting the center link 46c with the end links 46b, 46b.

Each end link 46b is provided, on its intermediate part, with a guide slit 46e. The end links 46 are urged outward by a pair of springs 46d. Each spring 46d is disposed in the guide part 22a and engaged with a projection 22b formed therein. The tip of each end link 46b is sharpened like a wedge and engaged in an engagement hole 47 formed in the outer cylinder 16.

That is, when the solenoid 45 is inactivated not to project the rod 45a, as shown in FIG. 21, the link mechanism 46 is totally expanded to be substantially linear, so that the tips of the end links 46b are engaged in the engagement holes 47. In this state, the outer cylinders 16 are prevented from rising and rotating, so that the left and right headrest members 11, 12 are maintained at their initial positions. Note, under the inactivated condition of the solenoid 45, the connecting links 46c are prevented from being folded in the opposite direction by stopper pins 48 behind the connecting links 46c.

Figure 22:
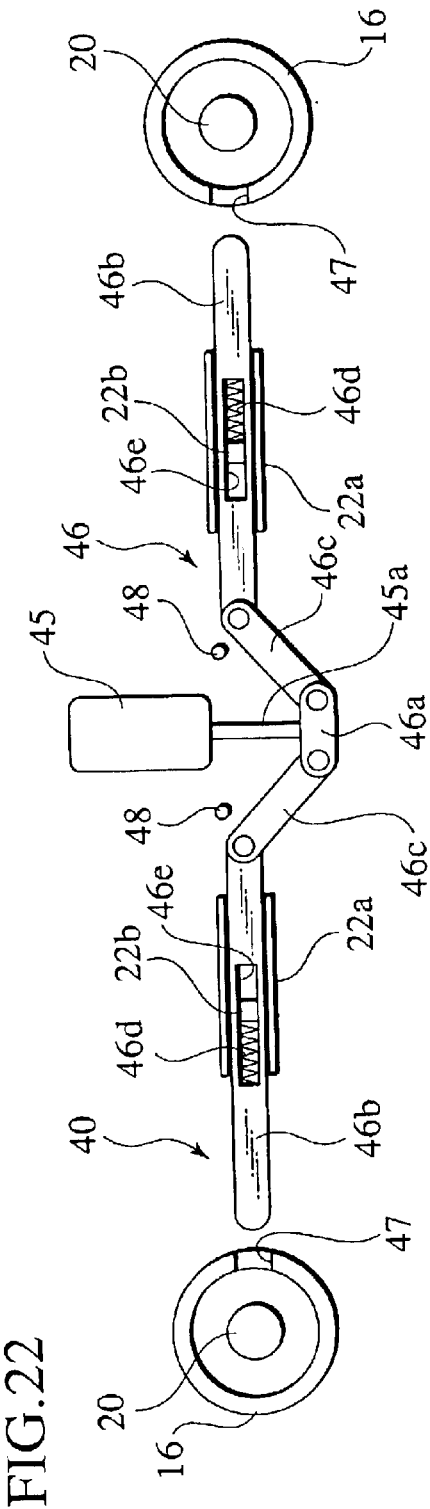
FIG. 22 is a plan view showing the locking mechanism of FIG. 21 in its unlocked condition.

While, with the supply of current, the solenoid 45 is activated to project the rod 45a and move the center link 46s forward, as shown in FIG. 22. Consequently, the end links 46b are attracted inward in opposition to the urging forces of the springs 46d, so that the tips of the end links 46b are disengaged from the engagement holes 47. Under such a situation, the outer cylinders 16 are elevated by the lifting mechanisms 31 and also rotated forward by the rotating mechanisms 32.

As similar to the first embodiment, by supplying the solenoid 45 with current in accordance with the control shown in FIG. 14, 17 or 18, the end links 46b of the link mechanism 46 are apart from the engagement holes 47 to bring the outer cylinders 16 into free conditions, as shown in FIG. 22. Consequently, since the lifting mechanisms 31 and the rotating mechanisms 32 fulfill their respective functions to raise the left and right headrest members 11, 12 and rotate them forward, the sheet 13 can be pushed obliquely upward. Therefore, according to the second embodiment, it is possible to exhibit the similar functions to those of the first embodiment.

[3rd. Embodiment]

FIGS. 23 to 31 shows the third embodiment of the present invention. Note, in these figures, elements similar to those of the previous embodiments are indicated with the same reference numerals respectively and their overlapping descriptions are eliminated.

Figure 23:
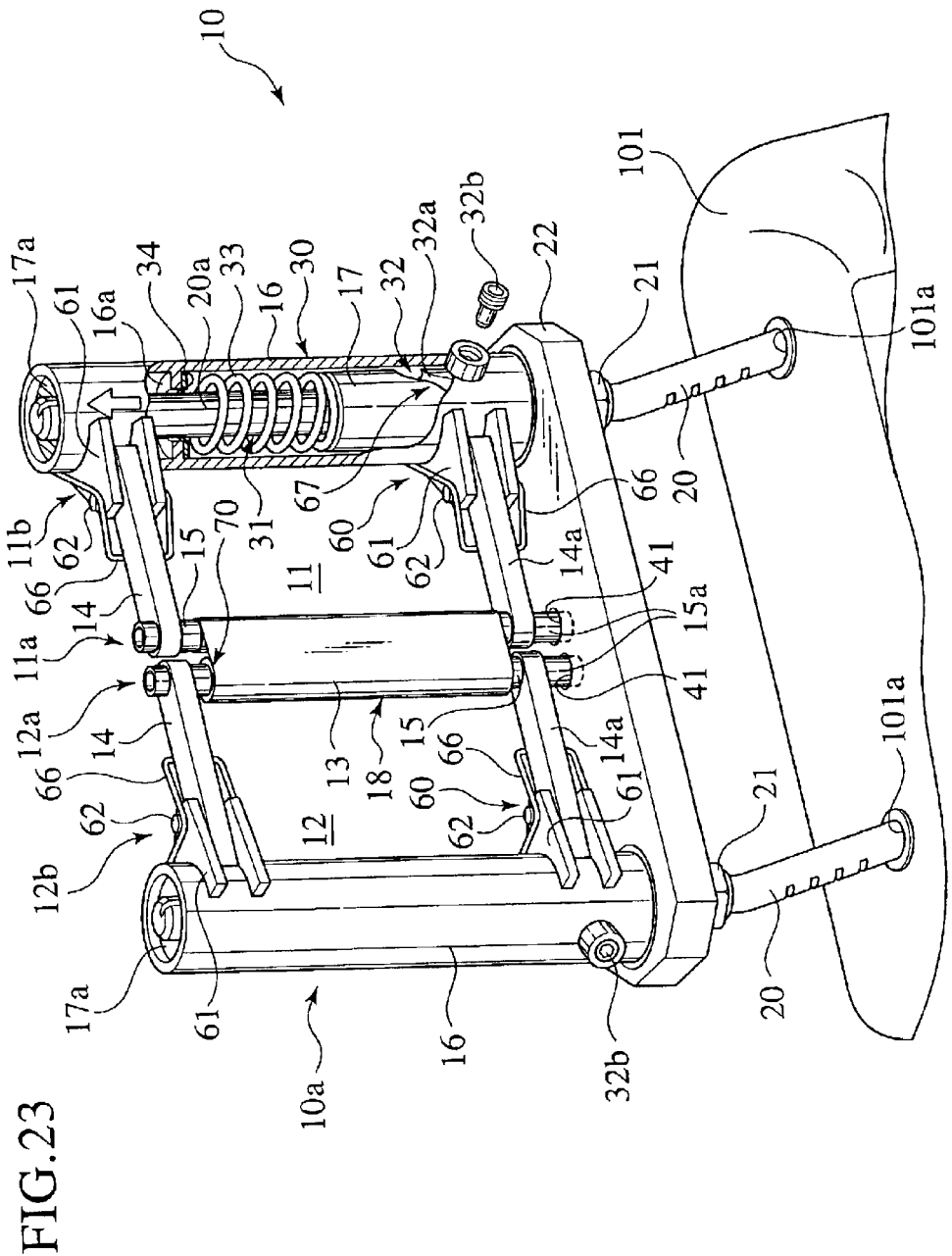
FIG. 23 is an enlarged perspective view showing the interior of the headrest apparatus of the third embodiment.
Figure 25:
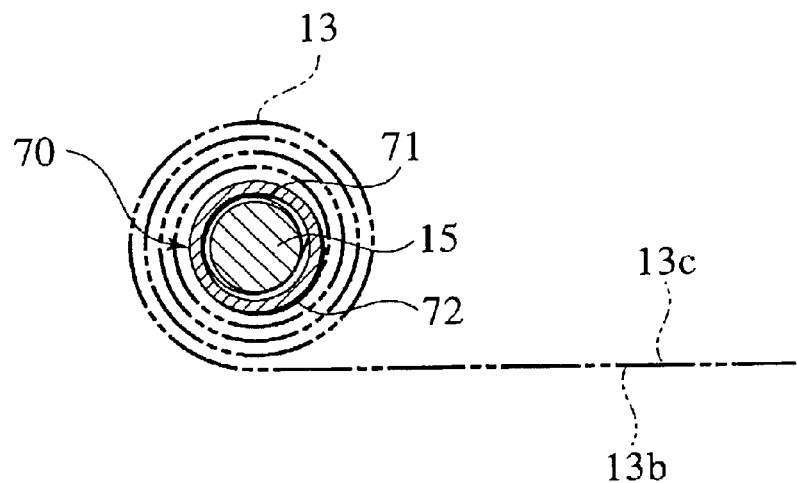
FIG. 25 is a sectional view of the winding mechanism forming the headrest apparatus of the third embodiment.

As clearly shown in FIGS. 23 and 25, according to the embodiment, the vertical arm of the left headrest member 12 is provided with a winding mechanism 70 (as a sheet tensioner) which always applies a tension to the sheet 13 irrespective of the rotating amounts of the left and right headrest members 11, 12. Of course, the winding mechanism 70 may be arranged on each of the vertical arms 15 of the members 11, 12 in the modification of the embodiment.

Figure 24:
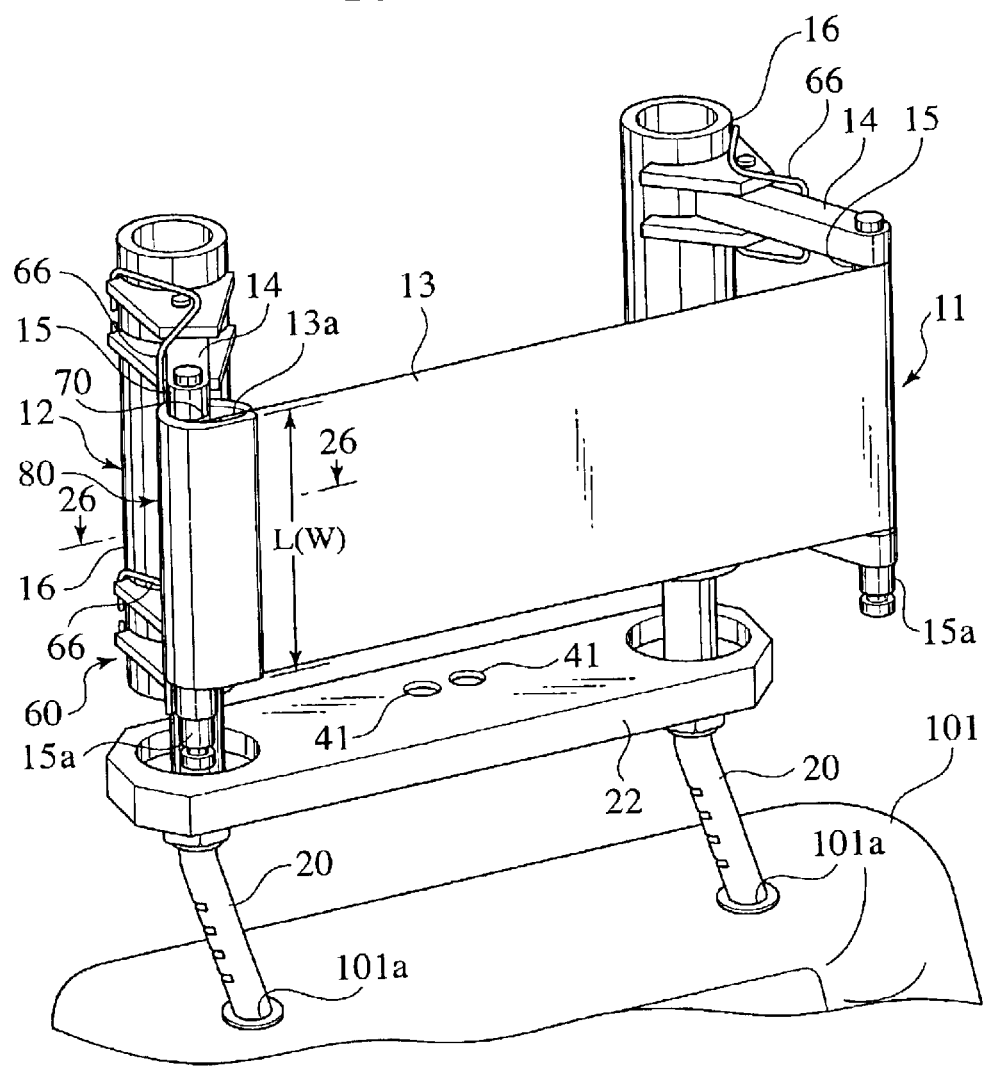
FIG. 24 is a perspective view of the headrest body of the third embodiment where the sheet stopper is attached, showing a condition that the unfolding operation is completed.

As shown in FIG. 24, the winding mechanism 70 is provided by rotatably fitting a winding cylinder 72 on the circumference of the vertical arm 15 through a coil spring 71 urged in the winding direction. The coil spring 71 has one end attached to the vertical arm 15 and the other end attached to the winding cylinder 72. Under a situation that the coil spring 71 accumulates a sufficient urging force in the winding direction, the sheet 13 has one end fixed to the winding cylinder 72, so that the sheet 13 is wound around the winding cylinder 72 due to the urging force of the coil spring 71.

Therefore, by pulling the sheet 13 out of the winding mechanism 70 in opposition to the urging force of the coil spring 71, the sheet 13 is extracted while allowing the coil spring 71 to accumulate the urging force in the winding direction. Needless to mention, the urging force of the coil spring 71 in the winding direction is established less than the rotating force of the left and right headrest members 11, 12 due to the rotating-and-urging mechanisms 30. With the above-mentioned structure, it is possible to accommodate the sheet 13 compactly and also possible to accomplish both extraction and accommodation of the sheet 13 smoothly.

Sheet Stopper

As shown in FIG. 24, according to the third embodiment, a pinching member 80 is arranged at a pay-out part 13a of the sheet 13 withdrawn from the winding mechanism 70, providing a sheet stopper. This pinching member 80 is formed by an elastic member, such as rubber. The pinching member 80 includes two leading ends in a closer relationship, providing a U-shaped cross section. Further, the same member 80 has a length L generally equal to a width W of the sheet 13 (see FIG. 24).

Figure 26:
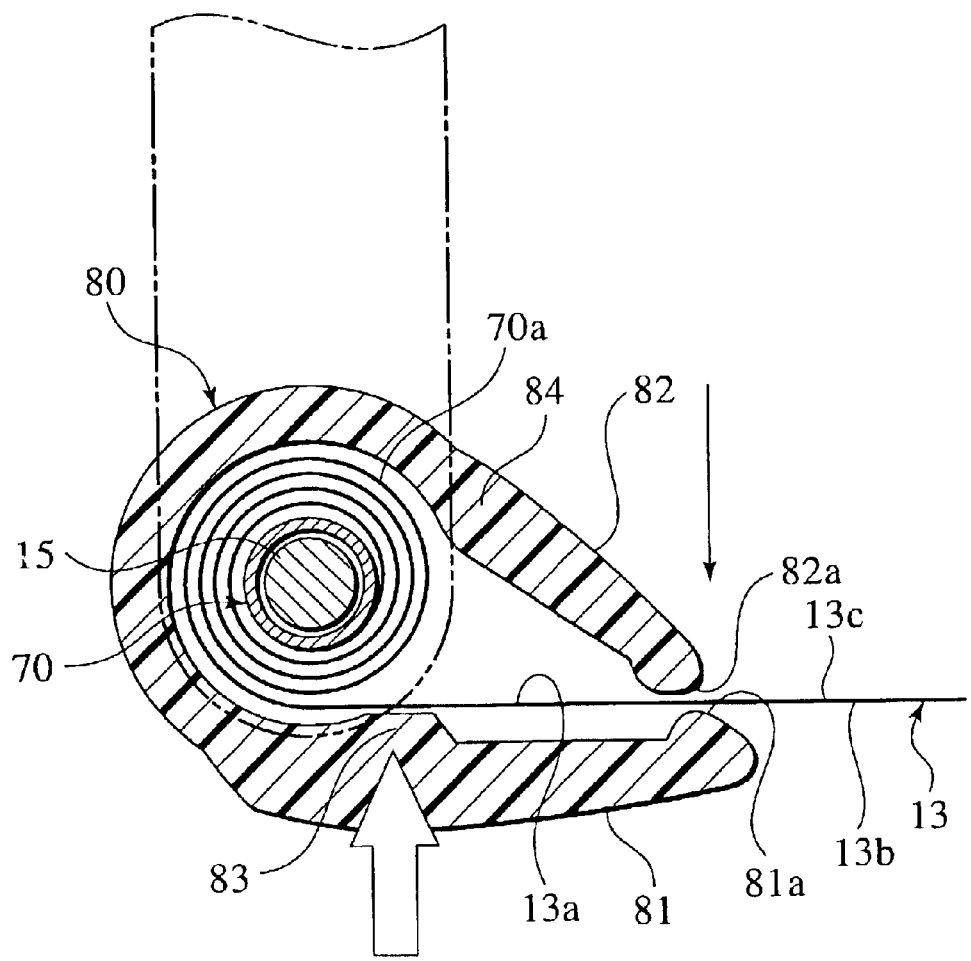
FIG. 26 is an enlarged sectional view taken along a line 26—26 of FIG. 24.

As shown in FIG. 26, the pinching member 80 is arranged around a winding part 70a of the sheet 13 wound by the winding mechanism 70, while both ends 81, 82 of the member 80 are arranged in the vicinity of both sides of the pay-out part 13a of the sheet 13.

Across the sheet 13, a tip 81a of the front end 81 on the side of a front face 13b of the sheet 13 is opposed to another tip 82a of the rear end 82 on the side of a rear face 13c of the sheet 13 while the tip 81a is somewhat shifted from the tip 82a to the side of the headrest center. The front end 81 is provided, at a position abutting against the periphery of the winding part 70a, with a fulcrum projection 83. On the other hand, the rear end 82 is provided, at a position abutting against the periphery of the winding part 70a, with a bending part 84.

Accordingly, if the front end 81 on the side of the front face 13b of the sheet 13 is subjected to a backward pressure due to the interference with the passenger's head H, the front end (part) 81 from the fulcrum 83 to the tip 81a is bent backward to press the tip 82a of the rear end 82 close to the rear face 13c of the sheet 13. Consequently, the rear end (part) 82 from the bending part 84 to the tip 82a is bent backward, so that the bending part 84 is forced on the winding part 70a, as a reaction of the above backward bending. Thus, the winding part 70a is pressed at two positions, that is, the fulcrum projection 83 and the bending part 84.

In this way, it becomes possible to prevent a further delivery of the sheet 13 from the winding mechanism 70.

Figure 27:
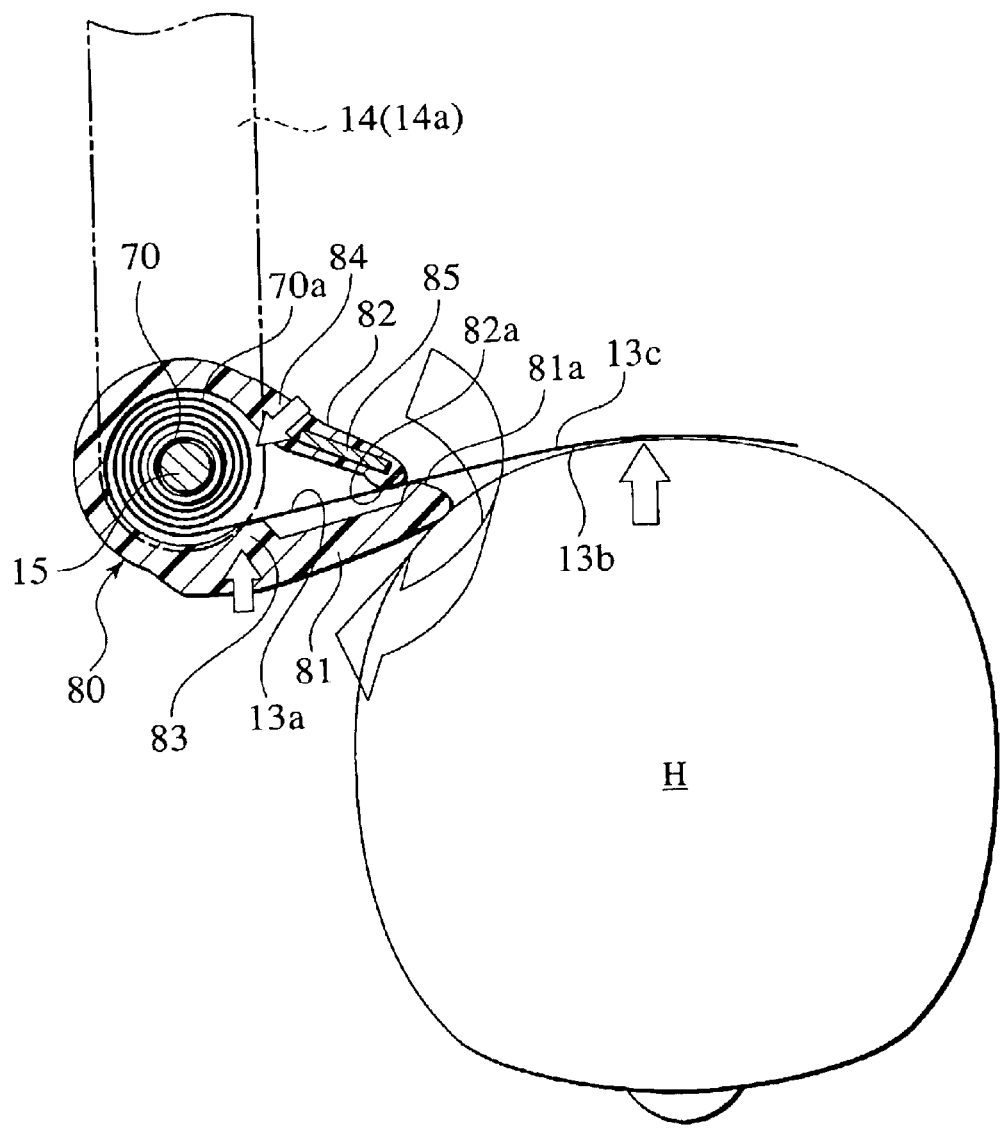
FIG. 27 is an enlarged sectional view showing the operation of the sheet stopper of FIG. 26.
Figure 28:
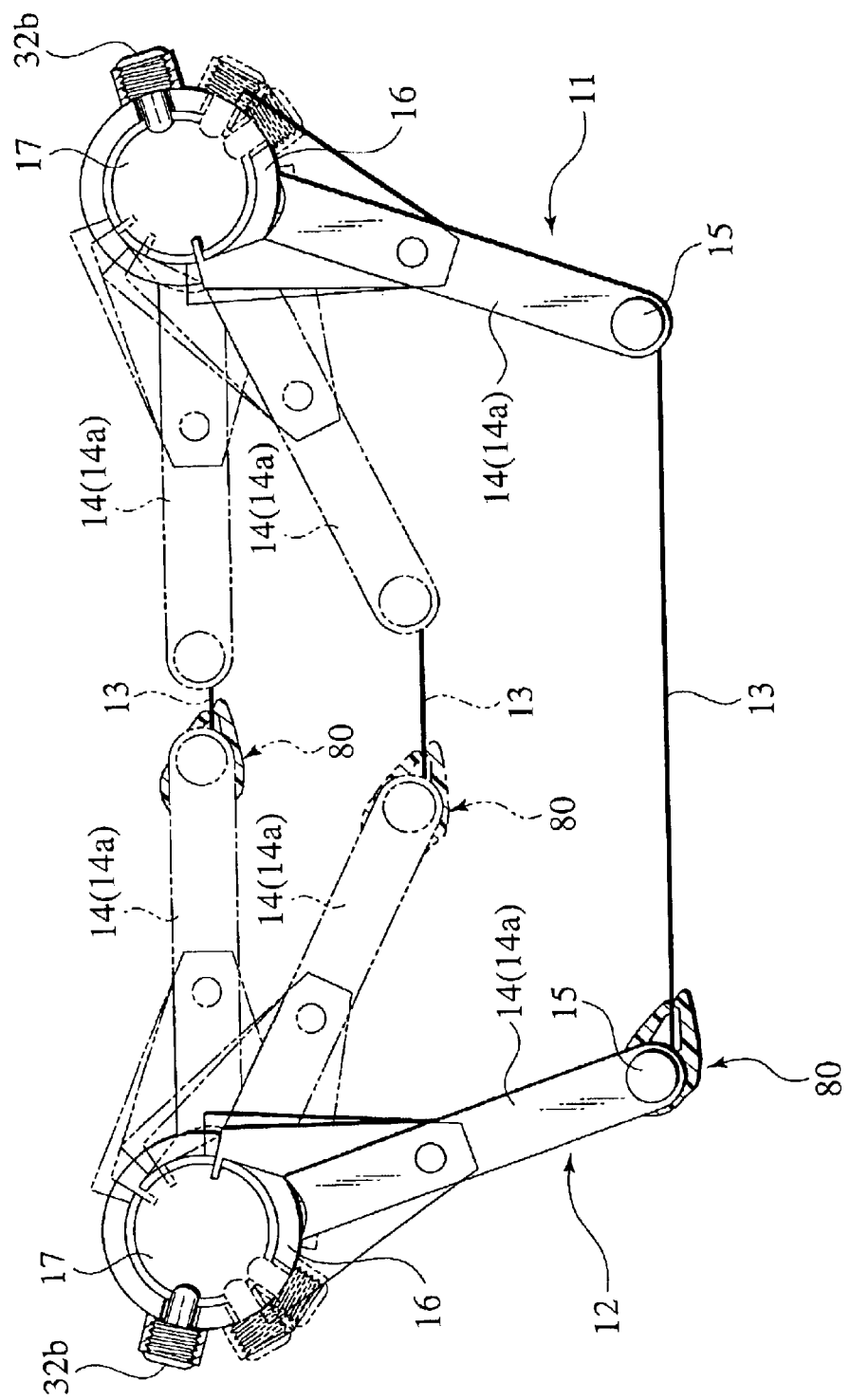
FIG. 28 is an explanatory view showing the relationship in position between the left and right headrest members and the sheet of the headrest apparatus of the third embodiment.
Figure 29:
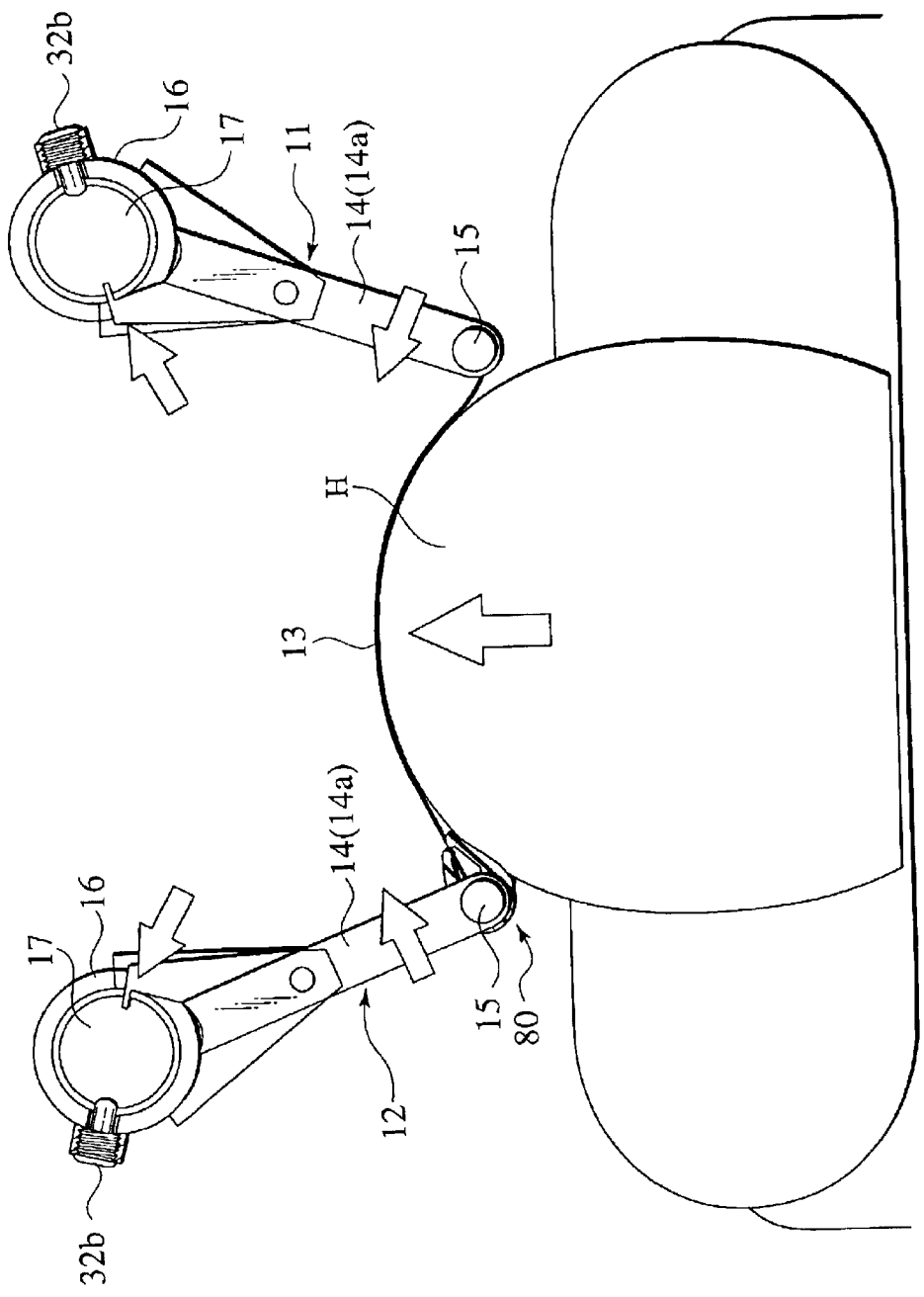
FIG. 29 is a plan view showing the relationship in position among the left and right headrest members, the sheet stopper and the fixing mechanism of the headrest apparatus of the third embodiment.

In connection, as shown in FIG. 27, it is desirable to embed a "deflection-proof" core material 85 in the rear end 82 between the tip 82a and the bending part 84 in view of positive promotion of the bending effect of the bending part 84.

Operation

The operation of the headrest apparatus of the third embodiment is similar to that of the first embodiment. That is, basically, the headrest apparatus of the third embodiment is operated in accordance with the flow chart of FIG. 14.

Besides, with the forward rotation of the left and right headrest members 11, 12, the sheet 13 between the vertical arms 15 is withdrawn out of the winding mechanism 70 into the unfolded state. Similarly to the first embodiment, since the sheet 13 is pushed upward and forward, it becomes possible to immediately catch and restrict the passenger's head H being moved backward by inertia due to the vehicle rear-end collision.

In addition to various effects of the first embodiment, the headrest apparatus 10 of the third embodiment has the following effects.

That is, since the sheet 13 is fully wound by the winding mechanism 70 when the left and right headrest members 11, 12 are at their initial positions, the sheet 13 can be housed compactly thereby to improve both outward appearance and function of the headrest apparatus.

Additionally, since the winding force of the winding mechanism 70 always acts on the sheet 13, it is possible to keep the sheet 13 getting tense usually irrespective of the rotating positions of the left and right headrest members 11, 12.

Consequently, it is possible to carry out reliable restriction of the passenger's head even when the left and right headrest members 11, 12 are on their way to full-opening positions.

Further, according to this embodiment, owing to the provision of the pinching member 80 at the pay-out part 13a of the sheet 13 extracted from the winding mechanism 70, if the passenger's head H comes into contact with the front end 81 of the pinching member 80 in the course of rotation of the left and right headrest members 11, 12 (FIG. 29), then a backward pressure acts on the contact area of the front end 81. Then, the winding part 70a of the winding mechanism 70 is pressed by the fulcrum projection 83 and the bending part 84 of the pinching member 80, whereby the pay-out of the sheet 13 can be locked up. Thus, since a further pay-out of the sheet 13 can be restricted owing to the locking operation, it is possible to restrict the passenger's head H by means of the sheet 13 surely.

Under such a locking condition, since the backward pressure of the passenger's head H acts on the transverse arms 14, 14a through the sheet 13, the fixing mechanisms 60 are certainly activated, so that the outer cylinders 16 can be locked about the inner cylinders 17.

Figure 30:
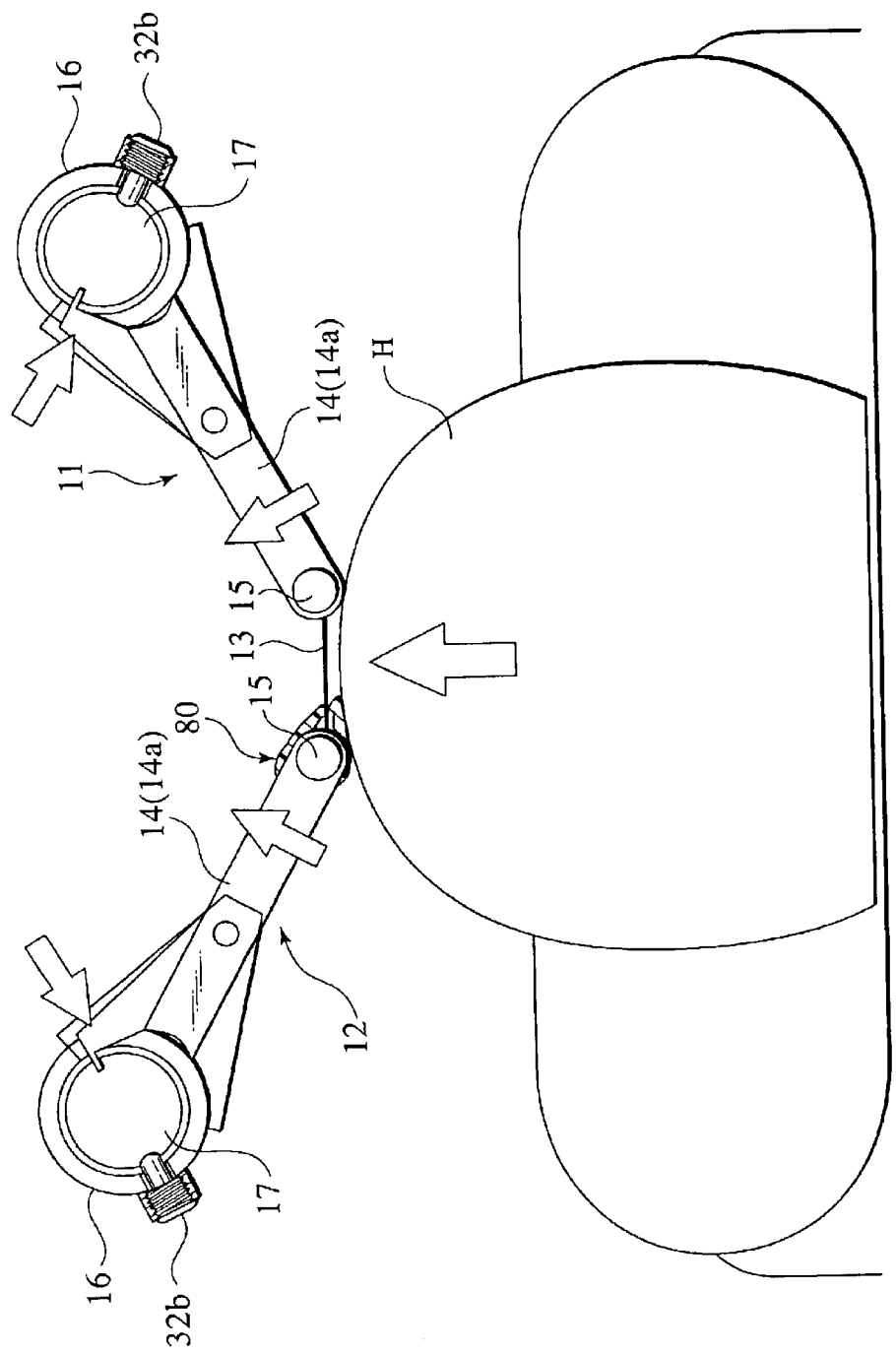
FIG. 30 is a plan view showing the relationship in position between the left and right headrest members on the early stage of rotation and the fixing mechanism of the headrest apparatus of the third embodiment.

Note, as shown in FIG. 30, if the left and right headrest members 11, 12 are at the beginning of rotation with a short interval between the separation ends 11a, 12a, then the passenger's head H directly acts on the transverse arm 14, 14a thereby to produce a backward pressure. Therefore, with the activation of the fixing mechanisms 60, it is possible to fix the left and right headrest members 11, 12.

Figure 31:
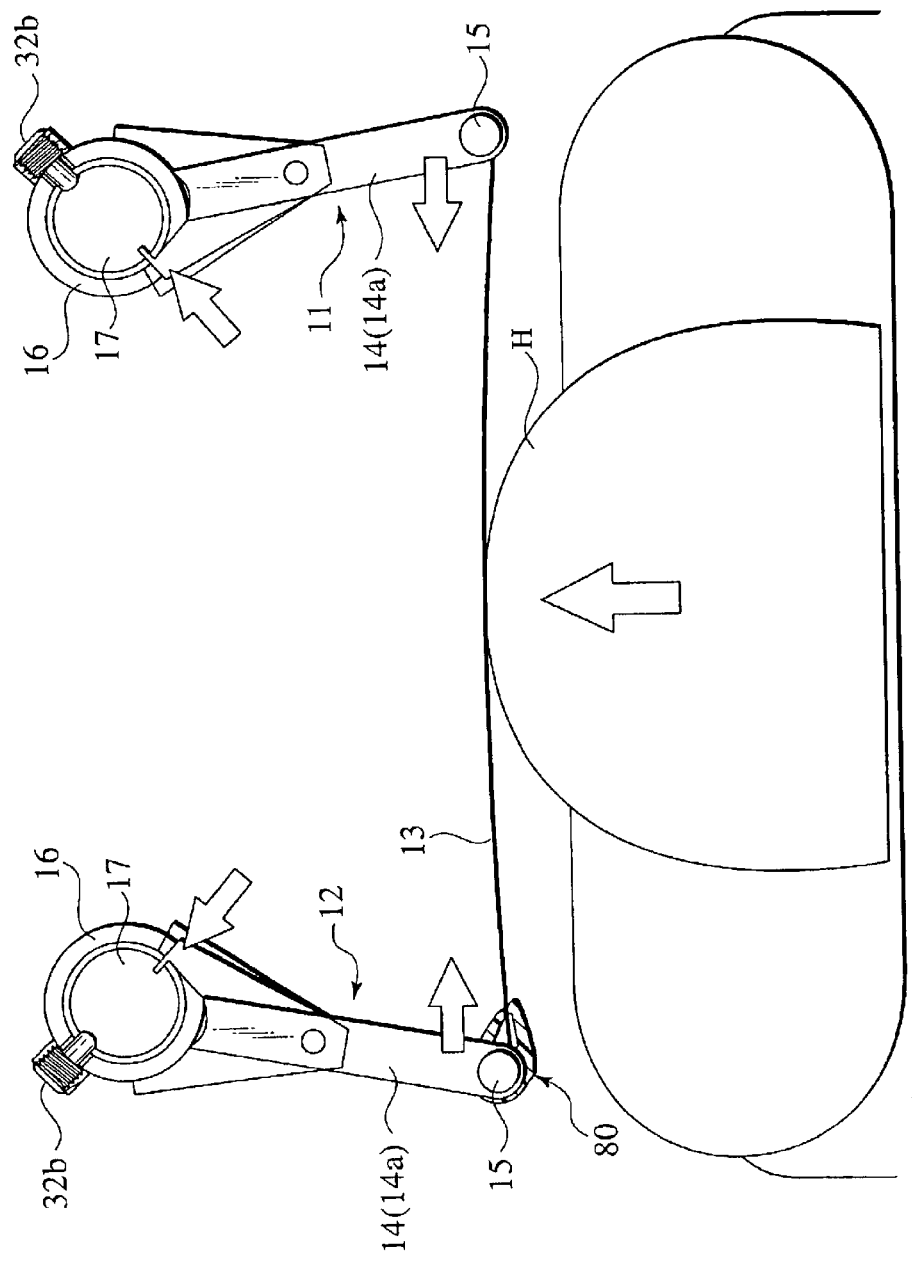
FIG. 31 is a plan view showing the relationship in position between the left and right headrest members on the completed stage of rotation and the fixing mechanism of the headrest apparatus of the third embodiment.

Further, when the left and right headrest members 11, 12 are rotated at the maximum rotating amounts as shown in FIG. 31 and therefore, the head H is restricted by the sheet 13 on completion of its unfolding operation, the head H does not come into contact with the pinching member 80. Nevertheless, since the tension of the sheet 13 is inputted to the left and right headrest members 11, 12, it is possible to fix the left and right headrest members 11, 12 owing to the operation of the fixing mechanisms 60.

According to the embodiment, the left and right headrest member 11, 12 of the headrest body 10b are urged forward in rotation by the rotating-and-urging mechanisms 30 while the members 11, 12 are held at their initial positions by the locking unit 40. At the vehicle's rear-end collision, the locking unit 40 is released by the control unit 50, so that the left and right headrest member 11, 12 rotate forward about the vehicle. Consequently, the separation ends 11a, 12a of the left and right headrest members 11, 12 are pushed forward in the fore-and-aft direction of the vehicle, so that the sheet 13 stretched between the separation ends 11a, 12a spreads to hold the passenger's head.

Therefore, a head restricting part, that is, the sheet 13 can be pushed out surely and quickly in comparison with the arrangement to push out the headrest body as a whole. Thus, it becomes possible to hold the passenger's head without delay, enhancing the safety for the head furthermore.

Then, since the sheet stretcher 70 always applies tension on the sheet 13 irrespective of the rotating amounts of the left and right headrest members 11, 12, it is possible to hold the passenger's head gently without making an impact on it.

Different from the conventional apparatus, the headrest apparatus of the embodiment does not detect fluctuation in load due to the inertia of the passenger but detects the vehicle's rear-end collision to drive the headrest body 10a. Thus, the headrest body 10a can be certainly and quickly activated to hold the passenger's head, irrespective of the passenger's weight and seating posture. In other words, since the seat-back 101 of the embodiment dispenses with a mechanism for detecting the fluctuations in load, it is possible to ensure seating comfortability of the seat-back 101 in itself without being restricted by its width, height and configuration and also possible to provide a lightweight seat.

According to the embodiment, the sheet stretcher 70 as the winding mechanism is constructed so as to wind the sheet 13 with an urging force and also adapted to bring the sheet 13 forward together with the rotations of the left and right headrest members 11, 12 forward of the vehicle. Therefore, until the left and right headrest members 11, 12 are rotated forward at the maximum to unfold the sheet 13 perfectly, it is possible to accommodate the sheet 13 in the winding mechanism compactly and also possible to accomplish both winding-out and housing of the sheet 13 smoothly.

According to the embodiment, since the sheet stopper 80 (or 90) at the pay-out part of the sheet 13 extracted from the winding mechanism 70 operates to lock the extraction of the sheet 13 by the application of backward pressure on the sheet 13 or the left and right headrest members 11, 12, it is possible to restrict the passenger's head by the strained sheet 13 in spite of the members 11, 12 being halfway in rotation.

[4th. Embodiment]

Figure 32:
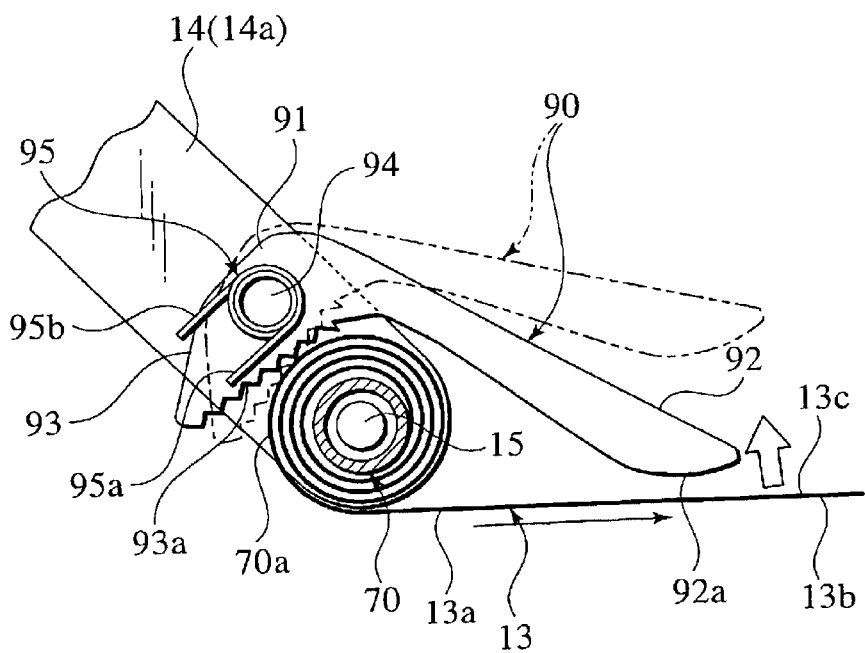
FIG. 32 is a plan view showing the condition of the sheet stopper in the middle of unfolding the sheet of the headrest apparatus of the fourth embodiment of the invention.
Figure 33:
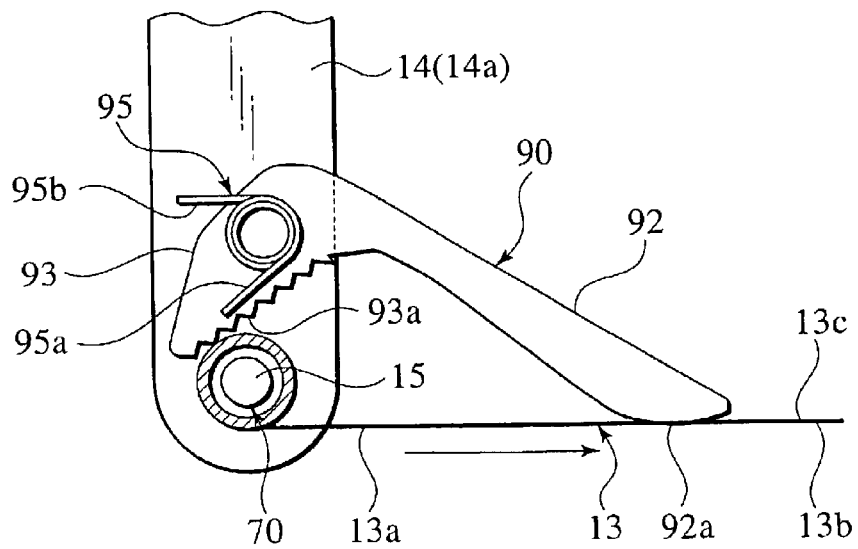
FIG. 33 is a plan view showing the condition of the sheet stopper of FIG. 32 at a point of completing to unfold the sheet.
Figure 34:
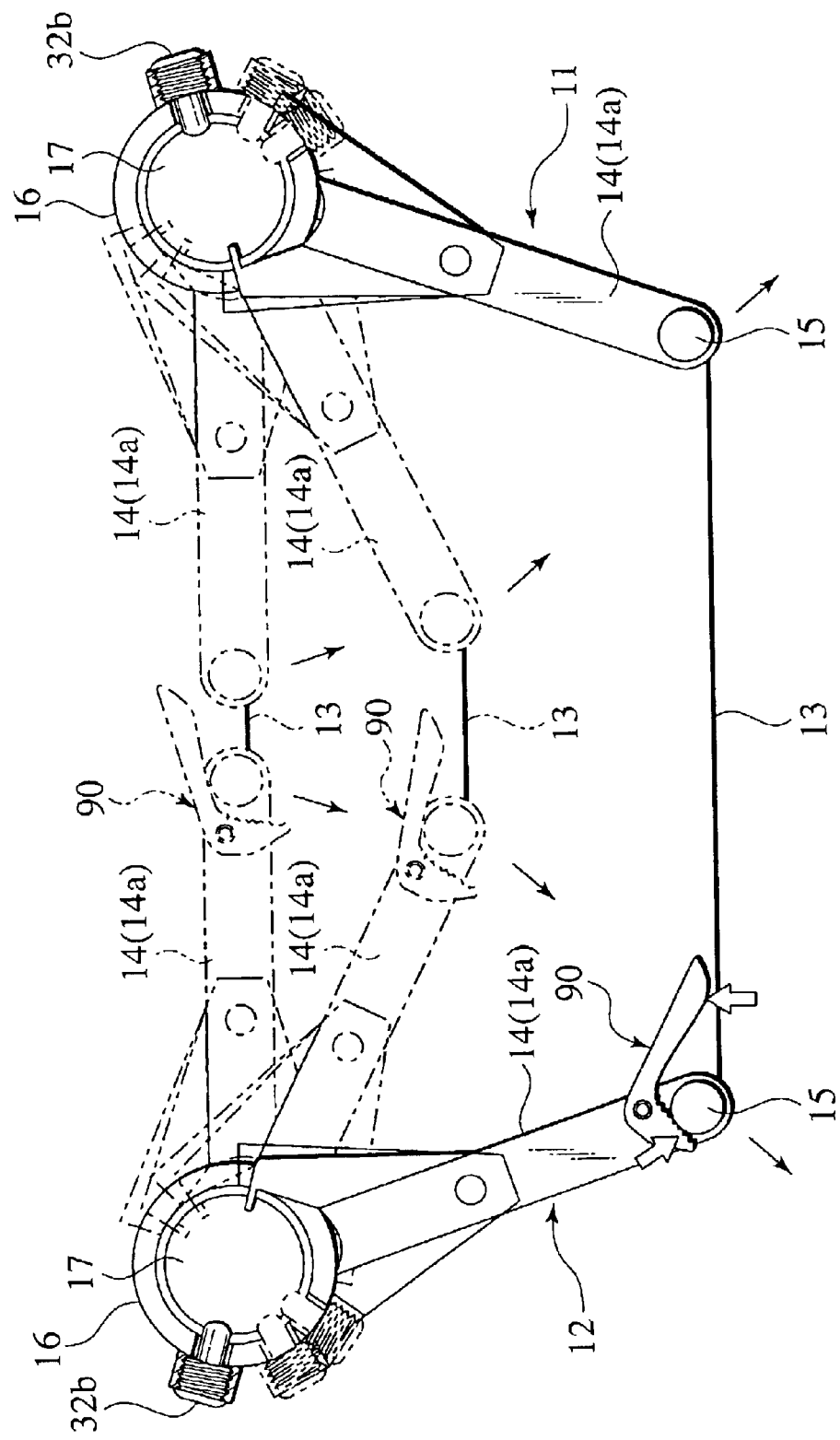
FIG. 34 is an explanatory view showing the relationship in position between the left and right headrest members and the sheet stopper of the headrest apparatus of the fourth embodiment.

FIGS. 32 to 34 show the fourth embodiment of the invention. In this embodiment, elements identical to those of the previous embodiments are indicated with the same reference numerals respectively and their overlapping descriptions are eliminated.

According to the fourth embodiment, as shown in FIG. 32, there is employed a rotating member 90 as the above sheet stopper. The rotating member 90 as a whole is generally L-shaped and arranged behind the winding part 70a of the sheet 13 rewound by the winding mechanism 70. At an intermediate portion 91 of the member 90, it is rotatably supported by the transverse arm 14 (14a) of the right headrest member 12 through a pivot pin 94. Preferably, the rotating members 90 in pairs are arranged on both sides of the sheet 13 in the vertical direction. In the modification, the rotating member 90 may be arranged on either side of the sheet 13.

The rotating member 90 is provided with one end 92 and the other end 93. In arrangement, the above end 92 is positioned on the side of the rear face 13c of the sheet 13 to provide an input part 92a of the rearward pressure acting on the sheet 13. On the other hand, the other end 93 is positioned in the vicinity of the winding part 70a of the winding mechanism 70 to provide a pressing part 93a that comes into pressure contact with the winding part 70a when a pressure is applied on the input part 92a.

On the intermediate portion 91 of the member 90, a torsion spring 95 is arranged about the pivot pin 94. The torsion spring 95 has its one end 95a engaged with the rotating member 90 and the other end 95b engaged with the transverse arm 14 (14a), so that the rotating member 90 is pivotally urged in the clockwise direction of the figures (FIGS. 32 and 33), in other words, a direction to bring the input part 92a close to the sheet 13.

Therefore, according to this embodiment, with the progress of the forward rotations of the left and right headrest members 11, 12 as shown in FIG. 34, the input part 92a of the rotating member 90 urged by the torsion spring 95 gradually approaches the sheet 13 which is being extracted from the winding mechanism 70 in the course of unfolding operation. Finally, at a point of time of completing the unfolding operation of the sheet 13, there can be realized a condition of FIG. 33 where the input part 92a comes into general contact with the sheet 13.

Under the above situation, if the passenger's head is restricted by the sheet 13, then the backward pressure exerted on the sheet 13 is transmitted to the input part 92a of the rotating member 92 over the sheet 13. Consequently, the rotating member 92 is rotated in the counter-clockwise direction of the figure, so that the pressing part 93a is forced to the winding part 70a of the winding mechanism 70. In this way, with the obstruction of the sheet 13 being withdrawn from the winding mechanism 70, it is possible to restrict the passenger's heat surely.

According to the embodiment, since the sheet stopper 80 (or 90) is formed by the pinching member 80 as an elastic member and is arranged about the periphery of the winding part 70a of the sheet 13 wound by the winding mechanism 70, it is possible to fit the sheet stopper 80 with ease. Under condition of fitting the sheet stopper 80, if the front end 81 on the side of the front face 13b of the sheet 13 is subjected to a backward pressure due to the interference with the passenger's head H, the front end (part) 81 presses the tip 82a of the rear end 82 close to the rear face 13c of the sheet 13 while the front end (part) 81 from the fulcrum 83 to the tip 81a is bent backward to press the tip 82a of the rear end 82 the sheet 13. Consequently, the rear end (part) 82 from the bending part 84 to the tip 82a is bent backward, so that the bending part 84 is forced on the winding part 70a, as a reaction of the above backward bending. Thus, in addition that the fulcrum projection 83 is pressed on the winding part 70a, it is possible to press the winding part 70a at two positions. In this way, it becomes possible to hold the passenger's head H certainly while preventing a further delivery of the sheet 13 from the winding mechanism 70.

According to the embodiment, if the passenger's head H is restricted by the sheet 13, which has been unfolded with the rotation of the left and right headrest members 11, 12, so that the sheet 13 is subjected to the backward pressure, then it is inputted to the input part of the rotating member 90. Consequently, since the rotating member 90 is rotated about the rotatably-supported intermediate portion 91, the pressing part of the rotating member 90 is brought into pressure contact with the winding part 70a of the sheet 13 wound into the winding mechanism 70. In this way, it becomes possible to hold the passenger's head H certainly while preventing a further delivery of the sheet 13 from the winding mechanism 70.

[5th. Embodiment]

Figure 35:
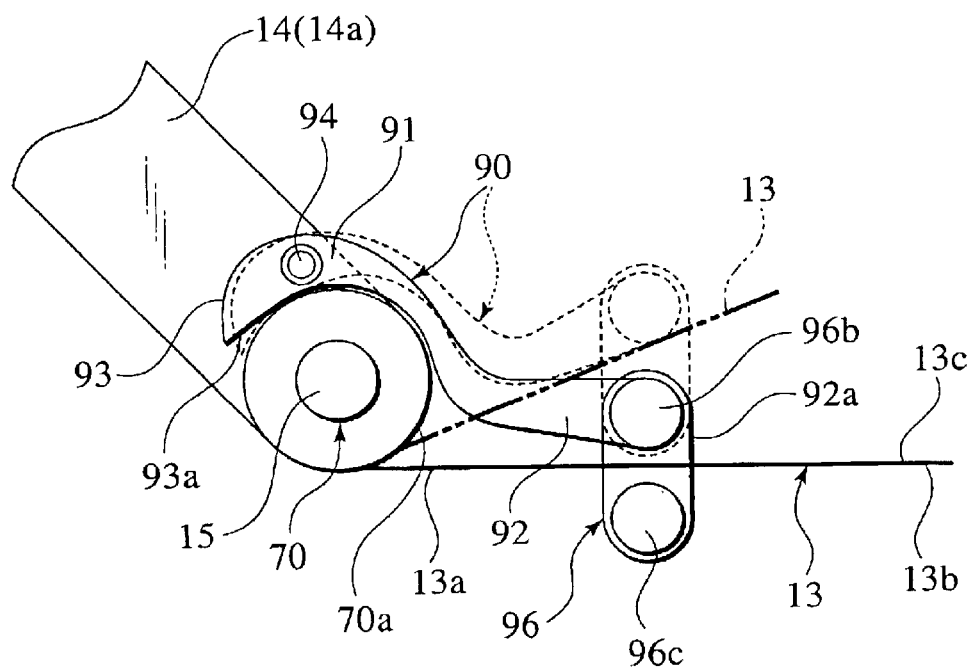
FIG. 35 is a plan view showing the sheet stopper forming the headrest apparatus of the fifth embodiment.
Figure 36:
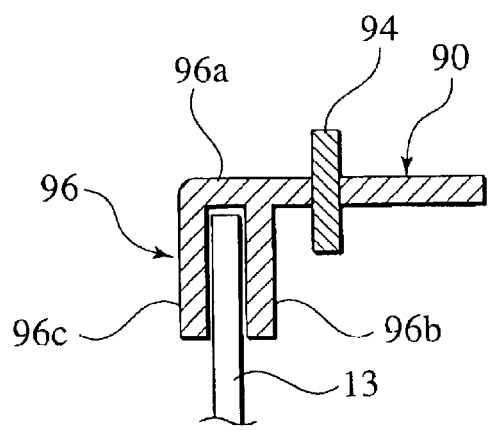
FIG. 36 is a schematic sectional view showing an essential part of the sheet stopper of the fifth embodiment.

FIGS. 35 and 36 show the fifth embodiment of the invention. Also in this embodiment, elements similar to those of the previous embodiments are indicated with the same reference numerals respectively and their overlapping descriptions are eliminated.

As similar to the fourth embodiment, the sheet stopper of this embodiment is formed by the rotating member 90 whose structure is somewhat different from the same member 90 of the previous embodiment.

According to the fifth embodiment, the rotating member 90 is provided, at the input part 92a, with an engagement part 97 for engagement with the faces 13b, 13c of the sheet 13, as shown in FIG. 35.

The engagement part 96 includes an extension member 96a extending from the input part 92a in the direction perpendicular to the sheet 13. As shown in FIG. 36, the engagement part 96 further includes a guide pin 96b projecting from the input part 92a along the rear face 13c of the sheet 13 and another guide pin 96c projecting from the leading end of the extension member 96a along the front face 13b of the sheet 13.

In operation, since the engagement part 96 at the input part 92a of the rotating member 90 engages with the front and rear faces 13b, 13c of the sheet 13, the rotating member 90 is rotated with the movements of the sheet 13 in front and in the rear. Therefore, according to the embodiment, since the rotating member 90 dispenses with a return spring corresponding to the torsion spring 95 of the third embodiment, it is possible to reduce the number of components forming the headrest apparatus.

[6th. Embodiment]

Figure 37:
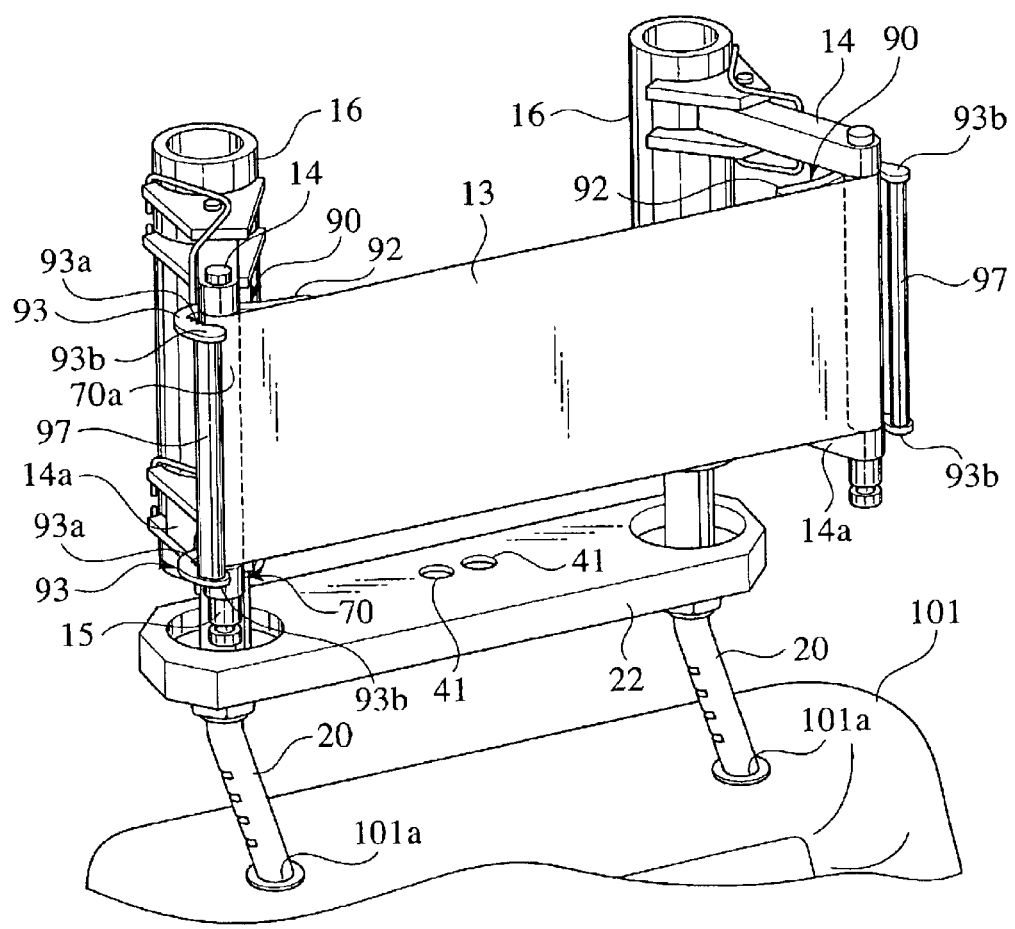
FIG. 37 is a perspective view showing the headrest apparatus equipped with the sheet stopper of the sixth embodiment.

FIG. 37 shows the sixth embodiment of the invention. Also in this embodiment, elements similar to those of the previous embodiments are indicated with the same reference numerals respectively and their overlapping descriptions are eliminated.

According to this embodiment, the sheet stopper of this embodiment is formed by a plurality of rotating members 90. The rotating members 90 in pairs are arranged on both sides of the upper part of the sheet 13, while the rotating members 90 in pairs are also arranged on both sides of the lower part of the sheet 13. Each rotating member 90 has its one end 93 arrange to extend in front of the winding part 70a of the sheet 13. On each side of the sheet 13 in the longitudinal direction, the end 93 of the upper rotating member 90 has a leading end 93b connected with another leading end 93b of the lower rotating member 90 through a connecting part 97.

Thus, since each of the connecting parts 97 is arranged on the front side of the winding parts 70a of the sheet 13, the contact of the passenger's head with the connecting part 97 allows the pressing part 93a of the rotating member 90 to bring into pressure contact with the winding part 70a of the sheet 13.

Therefore, even if the passenger's head comes into contact with the connecting parts 97 at a point of time when the rotating amounts of the left and right headrest members 11, 12 are small, in other words, at the initial stage where an interval between the vertical arms 15, 15 of the members 11, 12 is narrower than a width of the passenger's head, it is possible to prevent the sheet 13 from being discharged from the winding mechanism 70. Thus, further rotations of the headrest members 11, 12 can be restricted thereby to hold the passenger's head.

According to the embodiment, since the engagement part 96 of the input part is engaged with the front and rear faces of the sheet 13, the rotating member 90 is rotated by the fore-and-aft movement of the sheet 13. That is, since the rotating member 90 dispenses with a return spring, it is possible to reduce the number of components forming the headrest apparatus.

[7th. Embodiment]

Figure 38:
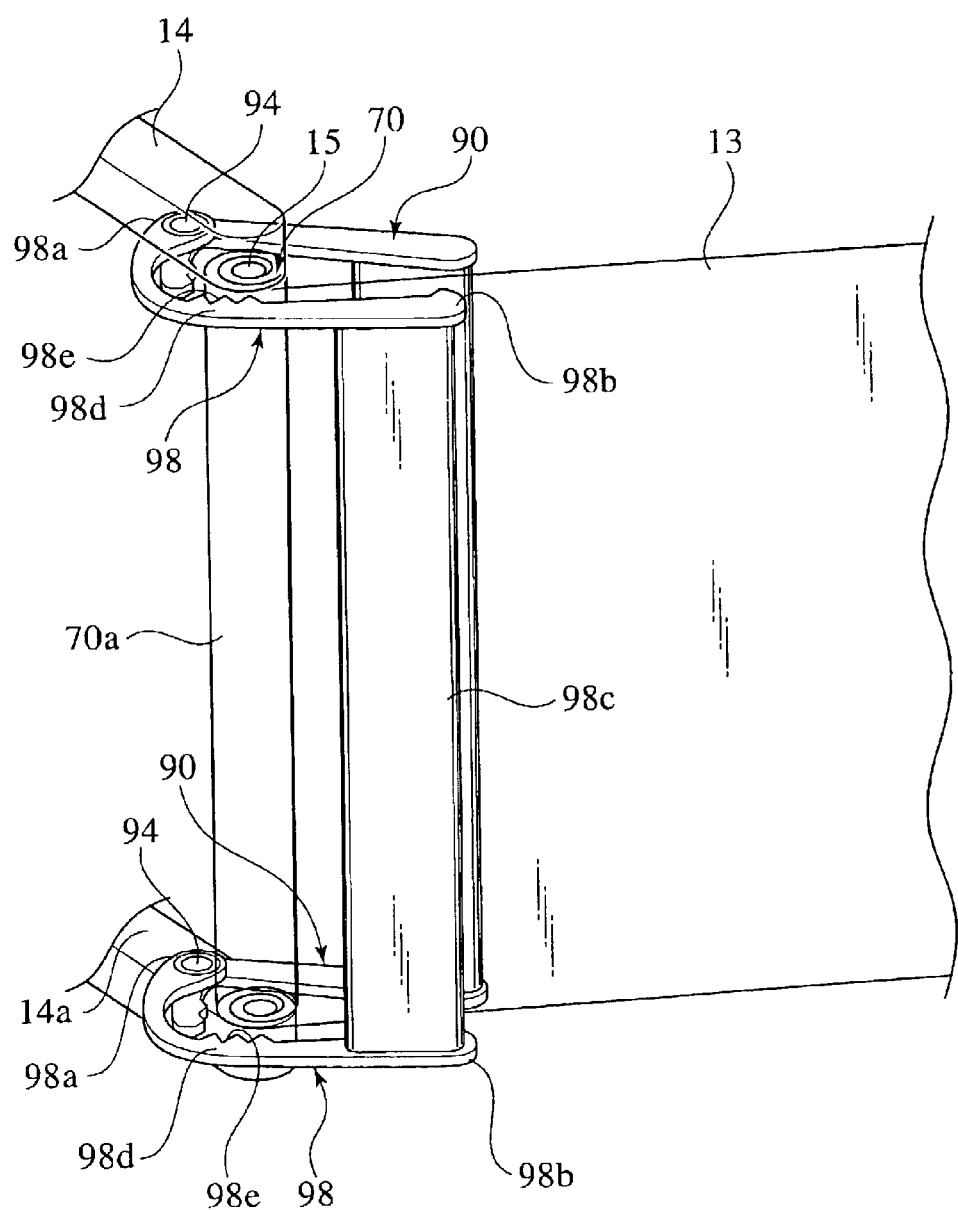
FIG. 38 is a perspective view showing the headrest apparatus equipped with the sheet stopper of the seventh embodiment.
Figure 39:
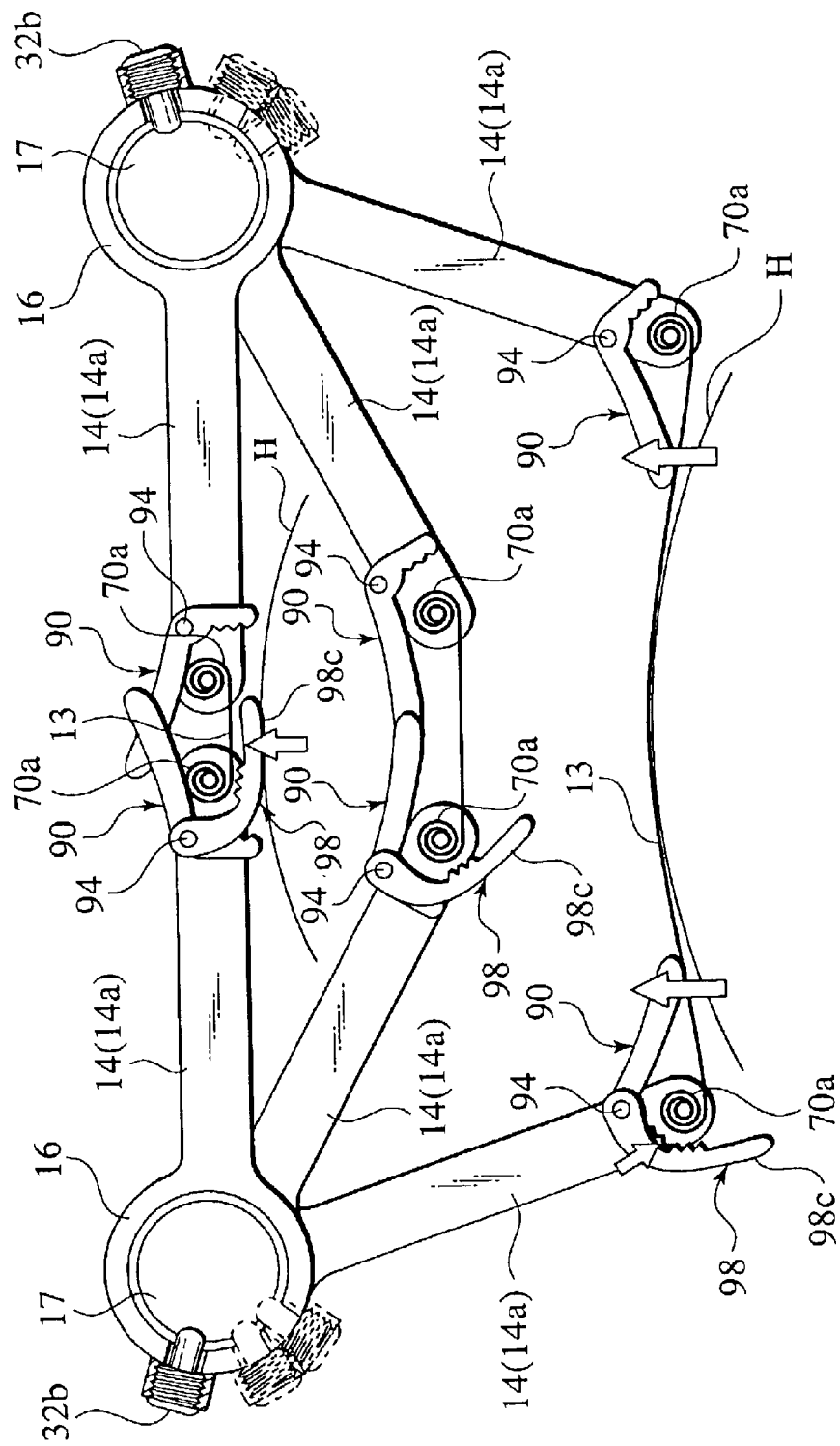
FIG. 39 is an explanatory view showing the relationship in position between the left and right headrest members and the sheet stopper of FIG. 38.

FIGS. 38 and 39 show the seventh embodiment of the invention. Also in this embodiment, elements similar to those of the previous embodiments are indicated with the same reference numerals respectively and their overlapping descriptions are eliminated.

The sheet stopper of the seventh embodiment is provided by adding an assistant sheet stopper 98 to the rotating member 90 of the fourth embodiment, as shown in FIG. 38. The assistant sheet stopper 98 has its base part 98a rotatably supported by each transverse arm 14 (14a) through the pivot pin 94 that rotatably supports the rotating member 90. On the other hand, the assistant sheet stopper 98 has a free end 98b arranged close to the front face 13b of the sheet 13.

According to the seventh embodiment, as shown in FIG. 39, the rotating members 90 are arranged on the upper and lower transverse arms 14, 14a of the left and right headrest members 11, 12. Being arranged on upper and lower ends on each side of the sheet 13, the headrest body 10a is provided with four rotating members 90 in total. While, the assistant sheet stoppers 98 are arranged corresponding to the upper and lower rotating members 90 on the left headrest member 12.

As shown in FIG. 38, in the upper and lower assistant sheet stoppers 98, the respective free ends 98b are connected with each other through a contact part 98c that the passenger's head will touch. Additionally, each assistant sheet stopper 98 is provided, on its intermediate portion 98d, with a pressing part 98e which is capable of pressure contact with the periphery of the winding part 70a.

Therefore, as shown in FIG. 39, while the left and right headrest members 11, 12 are rotated from the initial stage to the achieved state, the assistant sheet stoppers 98 have the free ends 98b positioned on the front side of the winding part 70a of the sheet 13 at the initial stage. With the progress of rotation of the members 11, 12 from the initial stage, the free ends 98b of the assistant sheet stoppers 98 are pushed aside from the winding part 70a.

Accordingly, since the passenger's head comes into contact with the contact part 98c of the assistant sheet stoppers 98 thereby to apply a backward pressure on the same part 98c at the initial stage where the rotating amounts of the headrest members 11, 12 are small, the pressing parts 98e are brought into pressure contact with the periphery of the winding part 70a, whereby it is possible to restrict the pay-out of the sheet 13 from the winding mechanism 70.

After the middle stage of the rotation of the headrest members 11, 12 where the passenger's head has not come into contact with the assistant sheet stoppers 98 any longer, the rotating members 90 can operate to stop the pay-out of the sheet 13. Thus, no matter which condition the sheet 13 exists in the unfolding course, it is possible to hold the passenger's head by the headrest members 11, 12 and the sheet 13.

According to the embodiment, since each connecting part 97 that connects the leading end 93b of the upper rotating member 90 with the leading end 93b of the lower rotating member 90 is arranged on the front side of the winding parts 70a of the sheet 13, the contact of the passenger's head with the connecting part 97 allows the pressing part 93a of the rotating member 90 to bring into pressure contact with the winding part 70a of the sheet 13. Therefore, even if the passenger's head comes into contact with the connecting parts 97 at a point of time when the rotating amounts of the left and right headrest members 11, 12 are small, in other words, at the initial stage where the rotating amounts of the members 11, 12 is narrower than a width of the passenger's head, it is possible to prevent the sheet 13 from being extracted from the winding mechanism 70. Thus, further rotations of the headrest members 11, 12 can be restricted to hold the passenger's head.

According to the embodiment, when the passenger's head comes into contact with the contact part 98c of the assistant sheet stoppers 98 to apply a backward pressure on the same part 98c, the pressing parts 98e are brought into pressure contact with the periphery of the winding part 70a, so that it becomes possible to restrict the pay-out of the sheet 13 from the winding mechanism 70. Accordingly, in case of the left and right headrest members' contact with the passenger's head at the initial stage where the rotating amounts of the members 11, 12 are relatively small, it is possible to hold the passenger's head with the restriction of further rotation of the headrest members 11, 12.

[8th. Embodiment]

Figure 40:
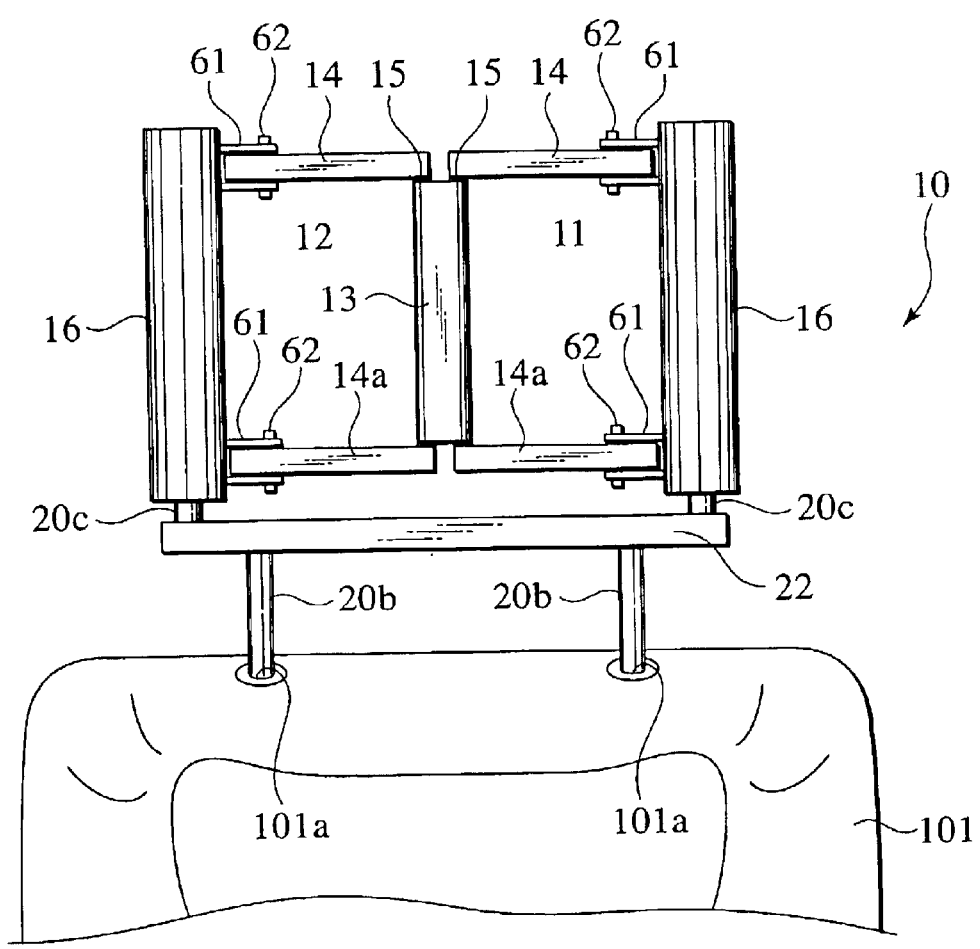
FIG. 40 is a front view showing the headrest body of the eighth embodiment of the invention.
Figure 41:
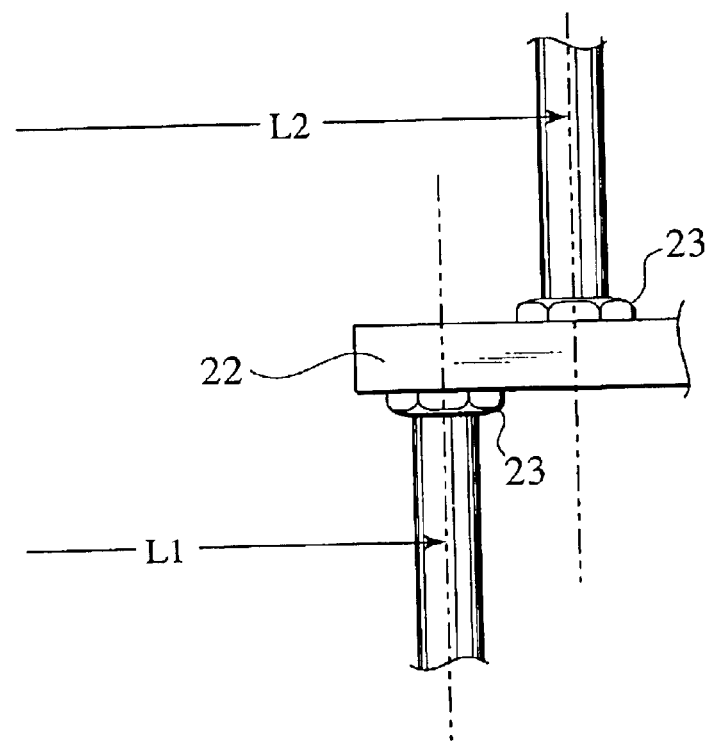
FIG. 41 is an enlarged front view of an essential part of the headrest body of FIG. 40.

FIGS. 40 and 41 show the eighth embodiment of the invention. In this embodiment, elements similar to those of the previous embodiments are indicated with the same reference numerals respectively and their overlapping descriptions are eliminated.

According to this embodiment, the stays 20 for attaching the headrest body 10a to the seat-back 101 are separated at the baseplate 20 in the left-and-right direction, providing a pair of stays 20b below the baseplate 22 and another pair of stays 20c above the baseplate 22.

As shown in FIG. 41, these stays 20b, 20c are arranged so that a distance L2 between the stays 20c is larger than a distance L1 between the stays 20b.

Therefore, according to the embodiment, since an interval between the outer cylinders 16 attached to the upper stays 20c is increased in the above way, it is possible to make the left and right headrest members 11, 12 of large size with increased widths. Thus, when the members 11, 12 are rotated forward, it is possible to restrict the passenger's head quickly with an increased projecting quantity of the sheet 13 and also certainly with an increased area of the unfolded sheet 13.

Figure 42:
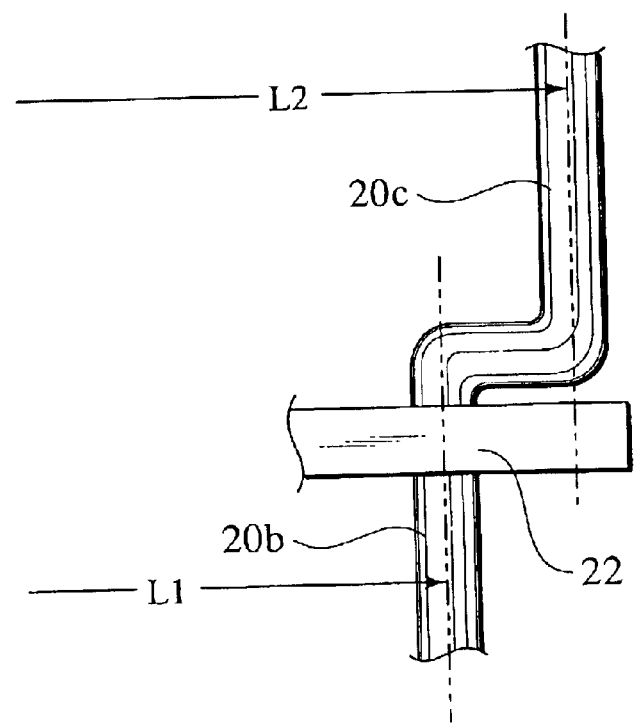
FIG. 42 is an enlarged front view of an essential part of the headrest body, showing the modification of the eighth embodiment of the invention.

In FIG. 41, the lower and upper stays 20b, 20c are screwed into nuts 23 secured on the baseplate 22. In the modification, the lower and upper stays 20b, 20c may be integrated into one stay penetrating the baseplate 22, as shown in FIG. 42. Then, the upper stays 20c are together cranked to increase the widths of the left and right headrest members 11, 12.

Although the headrest structure of the eighth embodiment is applied to the headrest body 10a of the first embodiment in the figures, the structure of the eighth embodiment is also applicable to the other headrest bodies, for example, the headrest body 10a of the second embodiment.

[9th. Embodiment]

Figure 43:
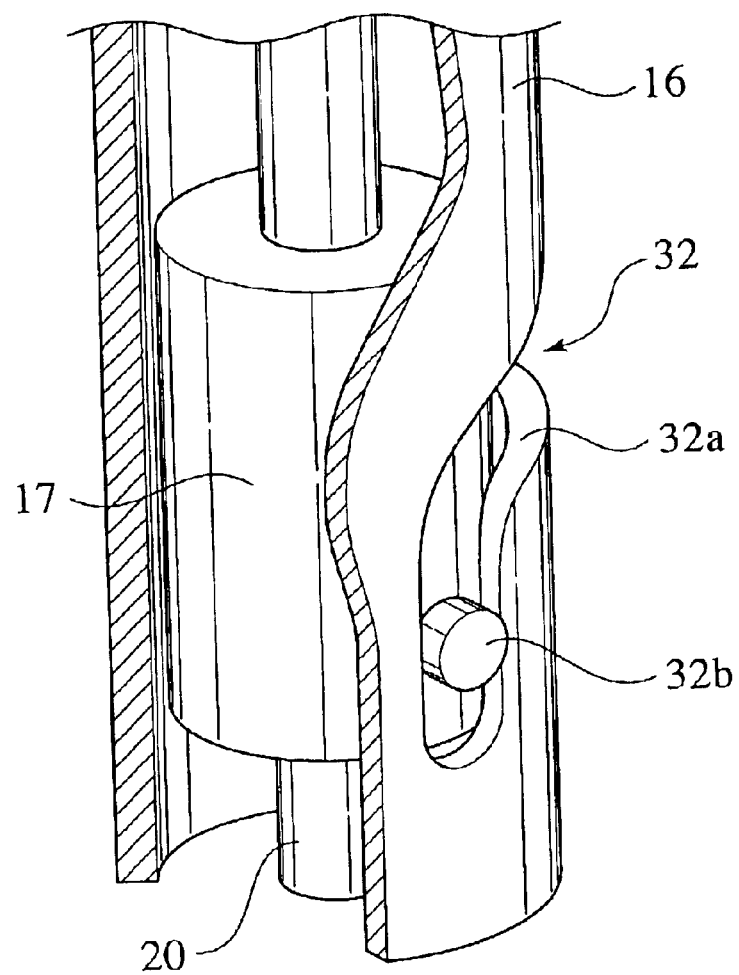
FIG. 43 is an enlarged perspective view of an essential part of the rotating mechanism of the ninth embodiment of the invention, also showing its partial section.

FIG. 43 shows another embodiment of the rotating mechanism forming the headrest apparatus, in accordance of the ninth embodiment of the invention. Also in this embodiment, elements similar to those of the previous-mentioned embodiments are indicated with the same reference numerals respectively and their overlapping descriptions are eliminated.

In the rotating mechanism 32 of this embodiment, the spiral groove 32a is formed on the side of the outer cylinder 16, while the bolts 32b for engagement with the spiral groove 32a is formed on the inner cylinder 17.

In operation, as similar to the above-mentioned embodiment, when the lifting mechanism (not shown) raises the outer cylinder 16, it is simultaneously rotated since the spiral groove 32a moves on restriction of the bolt 32b fixed on the inner cylinder 17. Note, FIG. 43 illustrates a condition that the rising of the outer cylinder 16 is completed.

In this embodiment, the bolt 32b moves along the spiral groove 32a with the lifting of the left and right headrest members 11, 12, so that the left and right headrest members 11, 12 are rotated forward about the vehicle. It is possible to adjust the amount of rotation relative to the amount of the lifting of the left and right headrest members 11, 12 with the inclination angle of the spiral groove 32a. Further, since the left and right headrest members 11, 12 are opened or closed by the movement of the bolt 32b along the spiral groove 32, it is possible to close the left and right headrest members 11, 12 by moving downward the left and right headrest members 11, 12 so that the bolt 32b reverses along the spiral groove 32a. Namely, the spiral groove 32a and the bolt 32b constitute a reversible structure which does not depend on the number of times of collision, thus it is possible to provide a reasonable headrest apparatus for a vehicle.

[10th. Embodiment]

Figure 44:
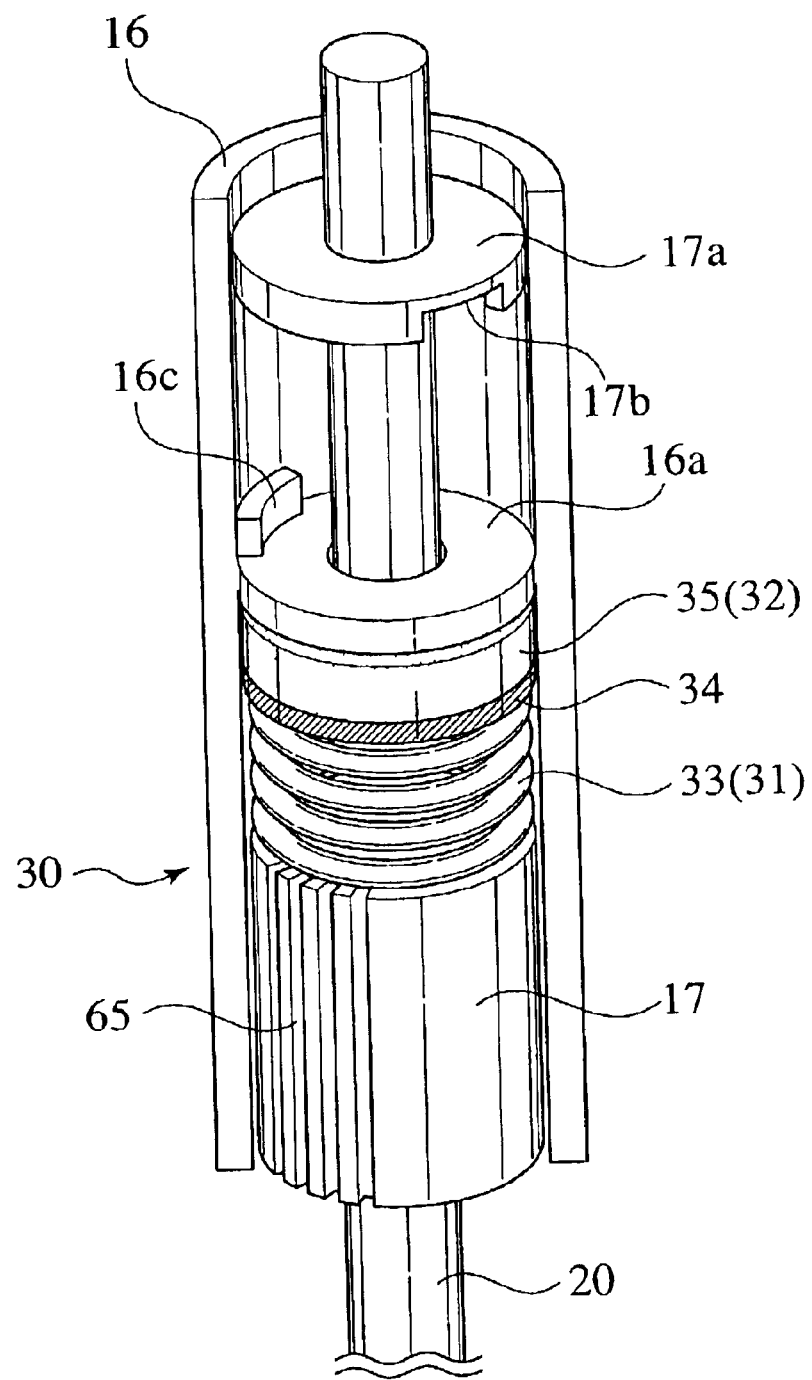
FIG. 44 is a sectional perspective view of a rotating and urging mechanism of the tenth embodiment of the invention, also showing its essential part before operating.
Figure 45:
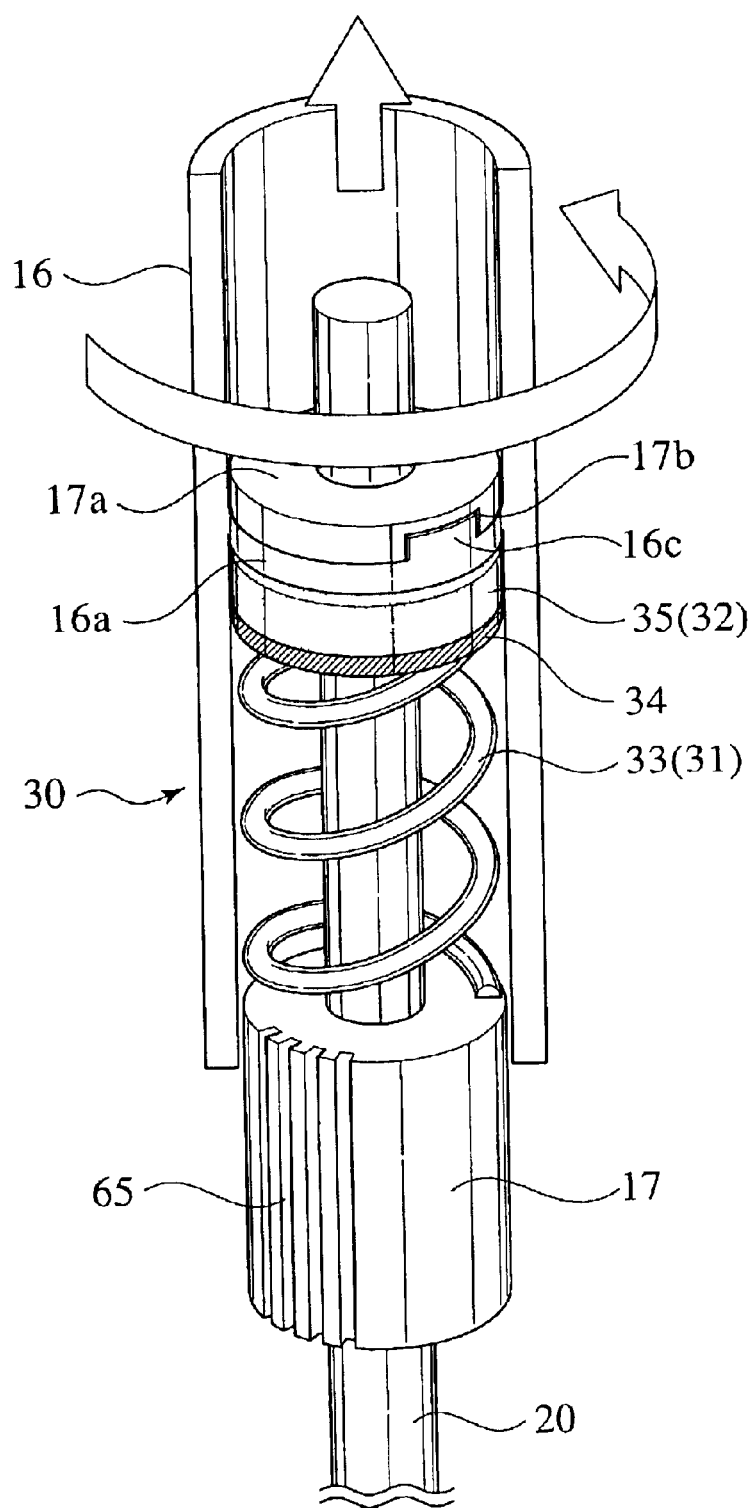
FIG. 45 is a sectional perspective view of the rotating and urging mechanism of FIG. 44, also showing its essential part after operating.

FIGS. 44 and 45 show the other embodiment of the rotating-and-urging mechanism forming the headrest apparatus, in accordance of the tenth embodiment of the invention. Also in this embodiment, elements similar to those of the previous-mentioned embodiments are indicated with the same reference numerals respectively and their overlapping descriptions are eliminated.

That is, the lifting mechanism 31 of the rotating-and-urging mechanism 30 of this embodiment is formed by the spring 33 shrunk between the upper end of the inner cylinder 17 and the small-diameter part 16a of the outer cylinder 16, as similar to the previous-mentioned embodiments. Different from the previous-mentioned embodiments, the rotating mechanism 32 of this embodiment includes a rotating spring 35 for rotating the outer cylinder 16.

The rotating spring 35 is adapted so as to accumulate an urging force in its rotating direction and also provided in the form of a spiral spring. Thus, the rotating spring 35 is provided with an inner-diameter end and an outer-diameter end. Either one of these ends is engaged with the side of the stay 20 while allowing of its axial movement. On the other hand, the other end of the rotating spring 35 is engaged with the outer cylinder 16. Further, it is established that when the left and right headrest members 11, 12 are at their initial positions, an urging force in the direction to rotate the left (or right) headrest member 11 (12) forward is accumulated in the rotating spring 35 (see FIG. 44). In operation, once the locking unit 40 is released, the outer cylinder 16 is elevated due to the urging force of the spring 33 and also rotated due to the urging force of the rotating spring 35, as shown in FIG. 45.

Additionally, at the top of each stay 20, the end plate 17a is provided, on its lower face, with a recess 17b, as shown in FIG. 44. While, the small-diameter part 16a is provided, on its upper face, with a projection 16c for engagement with the recess 17b. In operation, at a point of time when both rising and rotating of the outer cylinder 16 are together completed, the projection 16c engages with the recess 17b, so that the outer cylinder 16 is fixed on the inner cylinder 17, as shown in FIG. 45.

Accordingly, since the rotating mechanism 32 is formed by the rotating spring 35, the headrest apparatus of this embodiment can dispense with the spiral groove 32a and the bolt 32b of the previous embodiments, whereby the rotating mechanism 32 can be simplified.

Finally, it will be understood by those skilled in the art that the foregoing descriptions are nothing but some embodiments of the disclosed headrest apparatus for a vehicle. Besides these embodiments, various changes and modifications may be made to the present invention without departing from the spirit and scope of the invention.

Japanese Patent Applications No. 2001-245816 filed on Aug. 13, 2002 and No. 2001-245819 filed on Aug. 13, 2002 are expressly incorporated herein by reference in its entirety.

The scope of the invention is defined with reference to the following claims.

What is claimed is:

1. A headrest apparatus for a vehicle, comprising:
a headrest body attached to stays that are adapted for attachment to the upper end of a vehicle seat back to support a passenger's head;
wherein the headrest body includes:
a pair of left and right headrest members separated from each other at a substantial center of the headrest body in the left-and-right direction of the vehicle, the left and right headrest members each having one separation end adjacent to the other headrest member and the other end in opposition to the separation end, rotatably attached to the stay;
a sheet of stretchable material stretched between the separation ends of the left and right headrest members;
rotating-and-urging mechanisms for rotating and urging the left and right headrest members in a forward direction, respectively; and
a locking unit for holding the left and right headrest members at their initial positions in opposition to urging forces by the rotating-and-urging mechanisms; and
a control unit for releasing the locking unit on detection of a rear-end collision of the vehicle.

2. The headrest apparatus of claim 1, wherein each of the rotating-and-urging mechanisms includes a lifting mechanism for lifting the left or right headrest member with respect to the stay and a rotating mechanism for rotating the left or right headrest member forward about the vehicle with the lifting operation of the lifting mechanism.

3. The headrest apparatus of claim 2, wherein the rotating mechanism is provided with a fixing mechanism which fixes the left or right headrest member on the side of the stay as a result of applying a backward pressure on the left or right headrest member.

4. The headrest apparatus of claim 3, wherein the rotating mechanism has a relative rotating part arranged between the left or right headrest member and the fixing mechanism to allow of relative rotation therebetween, the relative rotating part having an urging unit for pressing the left or right headrest member forward about the vehicle.

5. The headrest apparatus of claim 2, wherein the rotating mechanism has an adjustment mechanism which allows a rotating amount of the left or right headrest member to be adjusted with respect to a rising amount thereof optionally.

6. The headrest apparatus of claim 5, wherein the adjusting mechanism includes a spiral groove formed on either one of the left or right headrest member and the stay and also inclined in a direction to rotate the left or right headrest member forward about the vehicle as the spiral groove directs upward, and the other one of the left or right headrest member and the stay has an engagement element for slidable engagement with the spiral groove.

7. The headrest apparatus of claim 1, wherein the headrest body further includes a housing part arranged between the left and right headrest members to house the sheet of stretchable material when the left and right headrest members are at their initial positions.

8. The headrest apparatus of claim 7, wherein the housing part is adapted so as to house the sheet of stretchable material under condition that it is being folded.

9. The headrest apparatus of claim 1, wherein the headrest body further includes a sheet stretcher which always applies tension on the sheet of stretchable material irrespective of rotating amounts of the left and right headrest members.

10. The headrest apparatus of claim 9, wherein the sheet stretcher is a winding mechanism which winds the sheet of stretchable material to at least either one of the separation ends of the left and right headrest members due to an urging force and which extracts the sheet of stretchable material with forward rotations of the left and right headrest members.

11. The headrest apparatus of claim 10, wherein the headrest body further includes a sheet stopper arranged at a pay-out part of the sheet of stretchable material extracted from the winding mechanism, for locking the extraction of the sheet of stretchable material due to application of backward pressure thereon.

12. The headrest apparatus of claim 11, wherein
the sheet stopper is formed by a pinching member arranged about the periphery of a winding part of the sheet of stretchable material wound by the winding mechanism, the pinching member being formed by an elastic member having both ends arranged close to both sides of the pay-out part of the sheet of stretchable material;
both ends of the pinching member are arranged so as to oppose the tip of a front end of the pinching member in front of the sheet of stretchable material to the tip of a rear end of the pinching member;
the front end of the pinching member is provided, at a position abutting on the periphery of the winding part, with a fulcrum projection; and
the rear end of the pinching member is provided, at a position abutting on the periphery of the winding part, with a bending part.

13. The headrest apparatus of claim 11, wherein
the sheet stopper is formed by a rotating member arranged behind a winding part of the sheet of stretchable material wound by the winding mechanism, the rotating member having its intermediate portion rotatably supported by
the side of the left and right headrest member; and
one end of the rotating member is arranged behind the sheet of stretchable material thereby to form an input part of a backward pressure acting on the sheet of stretchable material, while the other end of the rotating member is arranged close to the periphery of the winding part thereby to form a pressing part that comes into pressure contact with the winding part when the backward pressure is inputted to the input part.

14. The headrest apparatus of claim 13, wherein the input part is provided with an engagement part for engagement with front and rear faces of the sheet of stretchable material.

15. The headrest apparatus of claim 13, wherein
the sheet stopper has a pair of rotating members arranged on both upper and lower sides of the sheet of stretchable material, the rotating members having their ends extended up to the front side of the winding part of the sheet of stretchable material thereby to provide extension ends; and the extension ends are connected with each other through a connecting part.

16. The headrest apparatus of claim 13, further comprising an assistant sheet stopper which is juxtaposed with the sheet stopper, the assistant sheet stopper having its base part rotatably supported on either side of the left and right headrest members and a free end arranged close to the front face of the sheet of stretchable material, wherein the assistant sheet stopper has a contact part formed at the free end, for contact with the passenger's head and a pressing part formed at an intermediate portion of the assistant sheet stopper, for pressure contact with the periphery of the winding part.

17. A headrest apparatus for a vehicle, comprising:

a headrest body attached stays that are adapted for attachment to the upper end of a vehicle seat back to support a passenger's head;

wherein the headrest body includes:

a pair of left and right headrest members separated from each other at a substantial center of the headrest body in the left-and-right direction of the vehicle, the left and right headrest members each having one separation end adjacent to the other headrest member and the other end in opposition to the separation end, rotatably attached to the stay;

a sheet of stretchable material stretched between the separation ends of the left and right headrest members;

rotating-and-urging means for rotating and urging the left and right headrest members in a forward direction, respectively; and locking means for holding the left and right headrest members at their initial positions in opposition to urging forces by the rotating-and-urging mechanisms; and control means for releasing the locking means on detection of a rear-end collision of the vehicle.

* * * * *